(12) United States Patent
Wakuda

(10) Patent No.: US 11,874,968 B2
(45) Date of Patent: Jan. 16, 2024

(54) ELECTRONIC DEVICE

(71) Applicant: Alps Alpine Co., Ltd., Tokyo (JP)

(72) Inventor: Hiroshi Wakuda, Miyagi-ken (JP)

(73) Assignee: Alps Alpine Co., Ltd.

( * ) Notice: Subject to any disclaimer, the term of this patent is extended or adjusted under 35 U.S.C. 154(b) by 0 days.

(21) Appl. No.: 17/994,980

(22) Filed: Nov. 28, 2022

(65) Prior Publication Data

US 2023/0093640 A1    Mar. 23, 2023

Related U.S. Application Data

(63) Continuation of application No. PCT/JP2021/013286, filed on Mar. 29, 2021.

(30) Foreign Application Priority Data

Jul. 8, 2020    (JP) ................................ 2020-117801

(51) Int. Cl.
| | | |
|---|---|---|
| *G06F 3/01* | (2006.01) | |
| *G06F 3/0354* | (2013.01) | |
| *G06F 3/041* | (2006.01) | |

(52) U.S. Cl.
CPC .............. *G06F 3/016* (2013.01); *G06F 3/011* (2013.01); *G06F 3/03547* (2013.01); *G06F 3/041* (2013.01)

(58) Field of Classification Search
None
See application file for complete search history.

(56) References Cited

U.S. PATENT DOCUMENTS

| | | | |
|---|---|---|---|
| 2016/0364001 A1 | 12/2016 | Hirose et al. | |
| 2019/0050073 A1 | 2/2019 | Murakami | |
| 2020/0125174 A1* | 4/2020 | Oikawa ..................... B06B 1/04 |
| 2021/0342006 A1* | 11/2021 | Nakamura .............. G06F 3/016 |

FOREIGN PATENT DOCUMENTS

| | | |
|---|---|---|
| JP | 2016-163854 A | 9/2016 |
| WO | 2015-136923 A1 | 9/2015 |
| WO | 2017-145745 A1 | 8/2017 |
| WO | 2018-123661 A1 | 7/2018 |
| WO | 2018-139217 A1 | 8/2018 |
| WO | 2020-071412 A1 | 4/2020 |

OTHER PUBLICATIONS

International Search Report for corresponding International Application No. PCT/JP2021/013286 dated Jun. 1, 2021 (3 Pages).

* cited by examiner

*Primary Examiner* — Stephen T. Reed
(74) *Attorney, Agent, or Firm* — Harness, Dickey & Pierce, P.L.C.

(57) ABSTRACT

Provided is an electronic device that has a positional relationship between a plurality of attaching parts and a plurality of actuators of an operation panel that generates local vibration in the operation panel.
The electronic device includes a holding member; an operation panel on which a user performs an operation input; a plurality of attaching parts that attach the operation panel to the holding member; a plurality of actuators each of which is provided between adjacent attaching parts among the plurality of attaching parts in plan view and generates vibration in the operation panel; a position detection part that detects a position where the operation input is performed; and a control part that drives at least one of the plurality of actuators in accordance with a position detected by the position detection part.

18 Claims, 17 Drawing Sheets

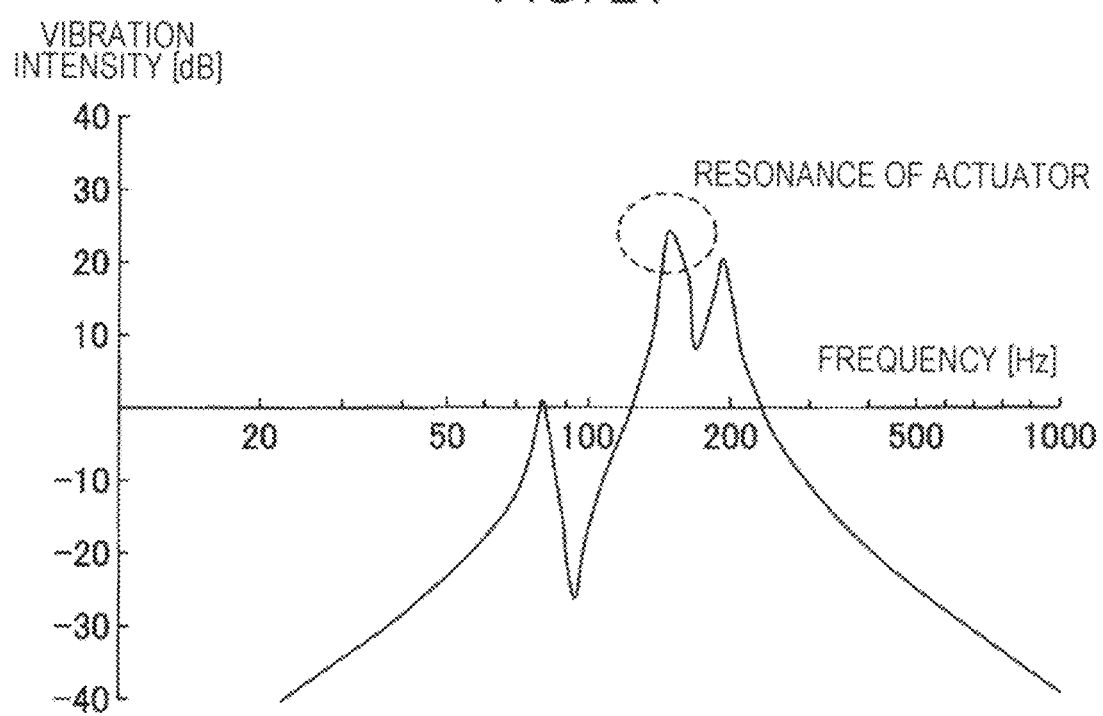

ELECTRONIC DEVICE

CLAIM OF PRIORITY

This application is a Continuation of International Application No. PCT/JP2021/013286 filed on Mar. 29, 2021, which claims benefit of Japanese Patent Application No. 2020-117801 filed on Jul. 8, 2020. The entire contents of each application noted above are hereby incorporated by reference.

BACKGROUND OF THE INVENTION

1. Field of the Invention

The present invention relates to an electronic device.

2. Description of the Related Art

Conventionally, haptically-enabled display devices including a display screen that has a viewing region and a non-viewing region and includes a plurality of display components configured to provide a visual display to the viewing region, a plurality of haptic actuators fixed to the display screen in the non-viewing region, and at least one processor are known. The at least one processor selects at least one haptic actuator from among the plurality of haptic actuators, activates the at least one haptic actuator, thus determines a haptic control signal configured to provide a localized haptic effect at a target location in the viewing region of the display device, and transmits the haptic control signal to the at least one haptic actuator to provide the localized haptic effect at the target location (see, for example, Japanese Unexamined Patent Application Publication No. 2019-215868).

SUMMARY OF THE INVENTION

Although conventional haptically-enabled display devices provide a localized haptic effect by using a combination of a plurality of actuators, details of arrangement, structures, and the like of the actuators and the display are not described. Furthermore, the conventional haptically-enabled display devices are not ones that provide a localized haptic effect based on a positional relationship between a fixing part that fixes the actuators and the display screen and the actuators.

The present invention provides an electronic device having a positional relationship between a plurality of attaching parts and a plurality of actuators of an operation panel that generates local vibration in the operation panel.

An electronic device according to an embodiment of the present invention includes a holding member; an operation panel on which a user performs an operation input; a plurality of attaching parts that attach the operation panel to the holding member; a plurality of actuators each of which is provided between adjacent attaching parts among the plurality of attaching parts in plan view and generates vibration in the operation panel; a position detection part that detects a position where the operation input is performed; and a control part that drives at least one of the plurality of actuators in accordance with a position detected by the position detection part.

It is possible to provide an electronic device that has a positional relationship between a plurality of attaching parts and a plurality of actuators of an operation panel that generates local vibration in the operation panel.

BRIEF DESCRIPTION OF THE DRAWINGS

FIG. 21 illustrates vibration characteristics according to the second embodiment.

DESCRIPTION OF THE PREFERRED EMBODIMENTS

Embodiments to which an electronic device of the present invention is applied are described.

First Embodiment

Figure 1:
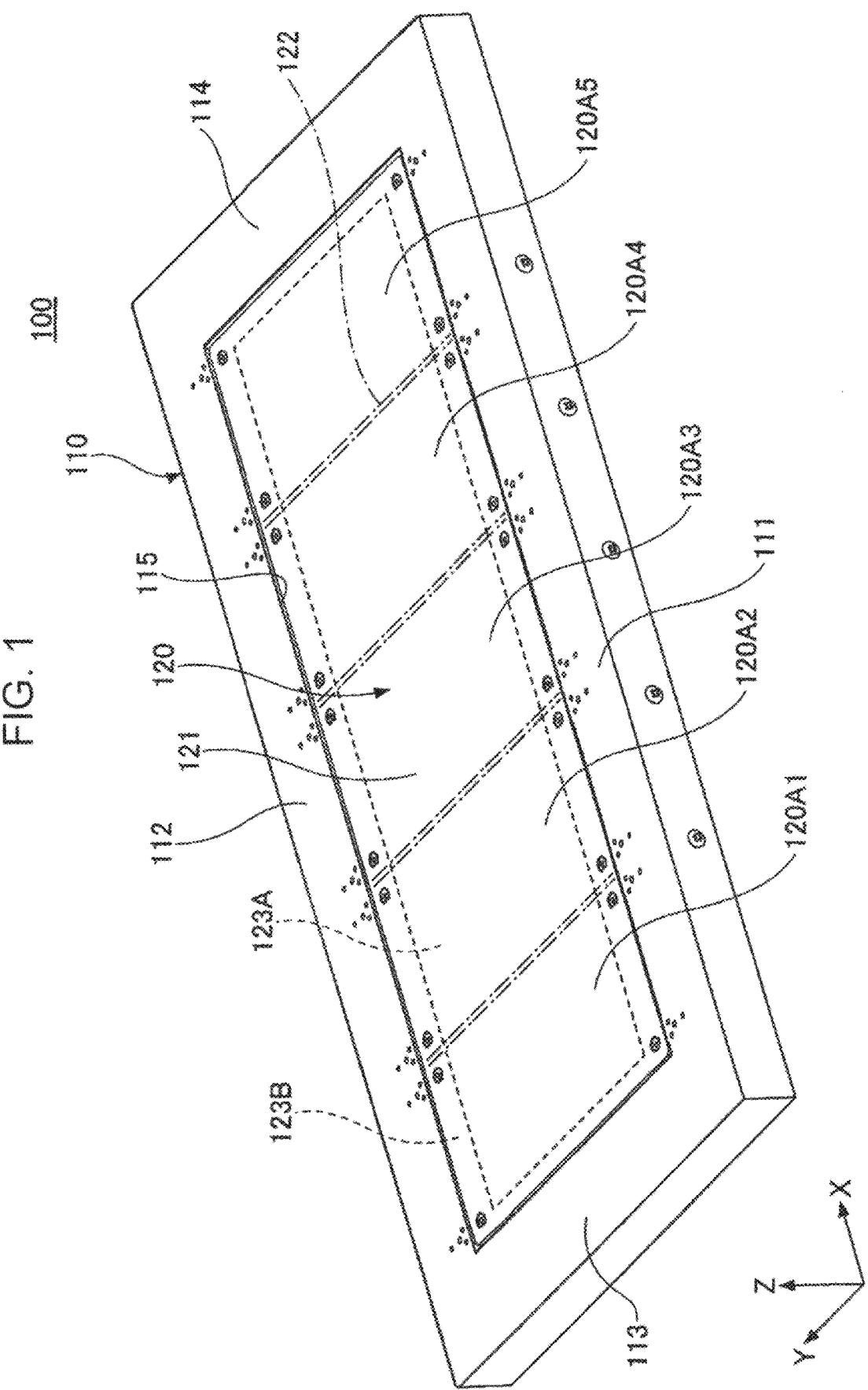
FIG. 1 is a perspective view illustrating an electronic device according to a first embodiment.
Figure 2:
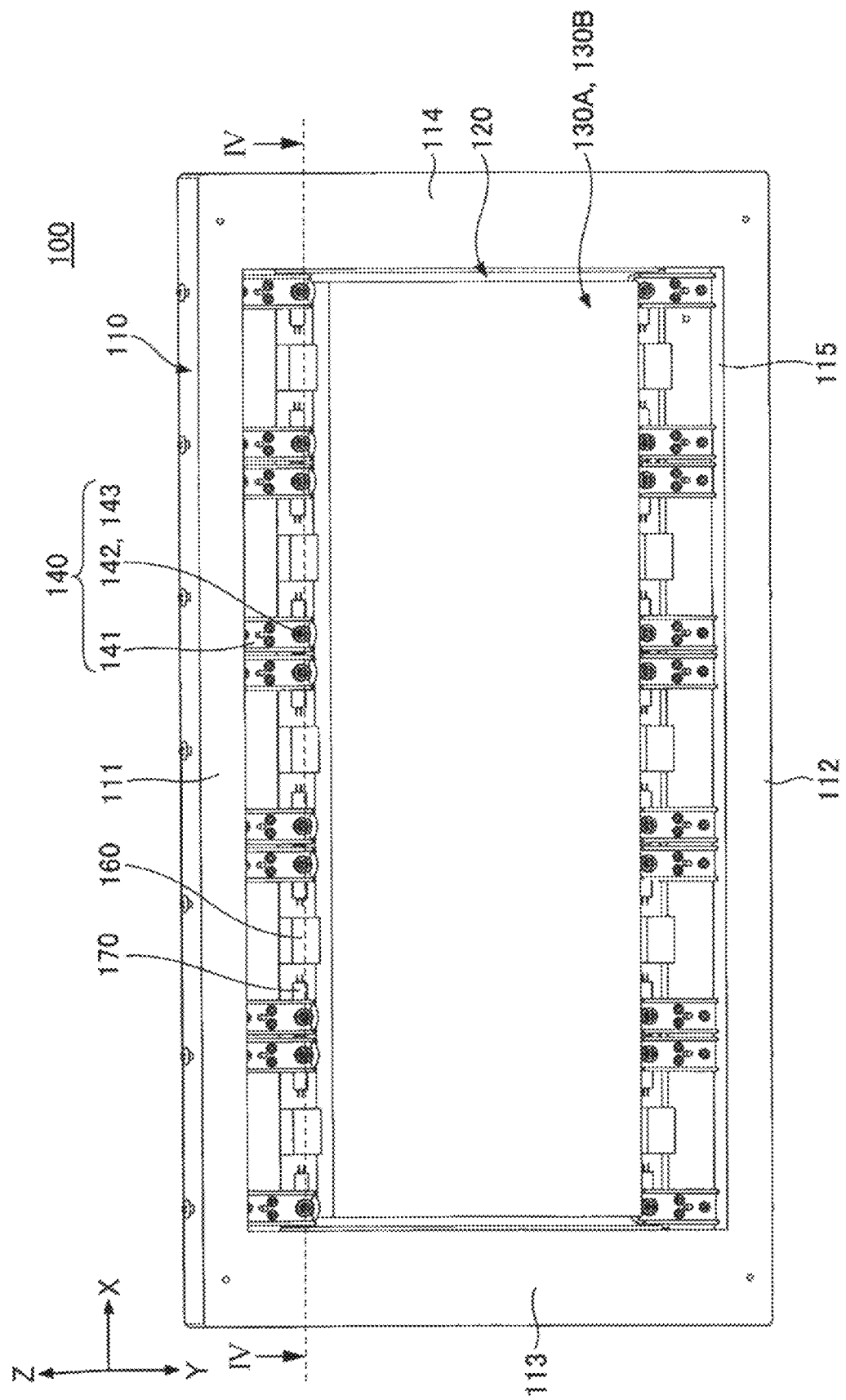
FIG. 2 illustrates a lower surface side of the electronic device according to the first embodiment.

FIG. 1 is a perspective view illustrating an electronic device 100 according to the first embodiment. FIG. 2 illustrates a lower surface side of the electronic device 100 according to the first embodiment. FIG. 2 illustrates a state where a cover on the lower surface side has been detached. In the following description, an XYZ coordinate system is defined. In the following description, plan view is a XY plane view. Although a −Z direction side is referred to as a lower side or down and a +Z direction side is referred to as an upper side or up for convenience of description, this does not indicate a universal up-down relationship. Furthermore, a thickness is a dimension in a Z direction unless otherwise specified.

The electronic device 100 includes a frame 110, an operation panel 120, a sensor sheet 130A, a liquid crystal display (LCD) 130B, a suspension device 140, an actuator 160, and an acceleration sensor 170. The electronic device 100 is a device having a thin plate shape extending in an XY plane. A longitudinal direction of the electronic device 100 is an X direction, and a short-side direction of the electronic device 100 is a Y direction. As for the longitudinal direction (the X direction) and the short-side direction (the Y direction), the same applies to the frame 110, the operation panel 120, the sensor sheet 130A, and the LCD 130B.

Figure 3:
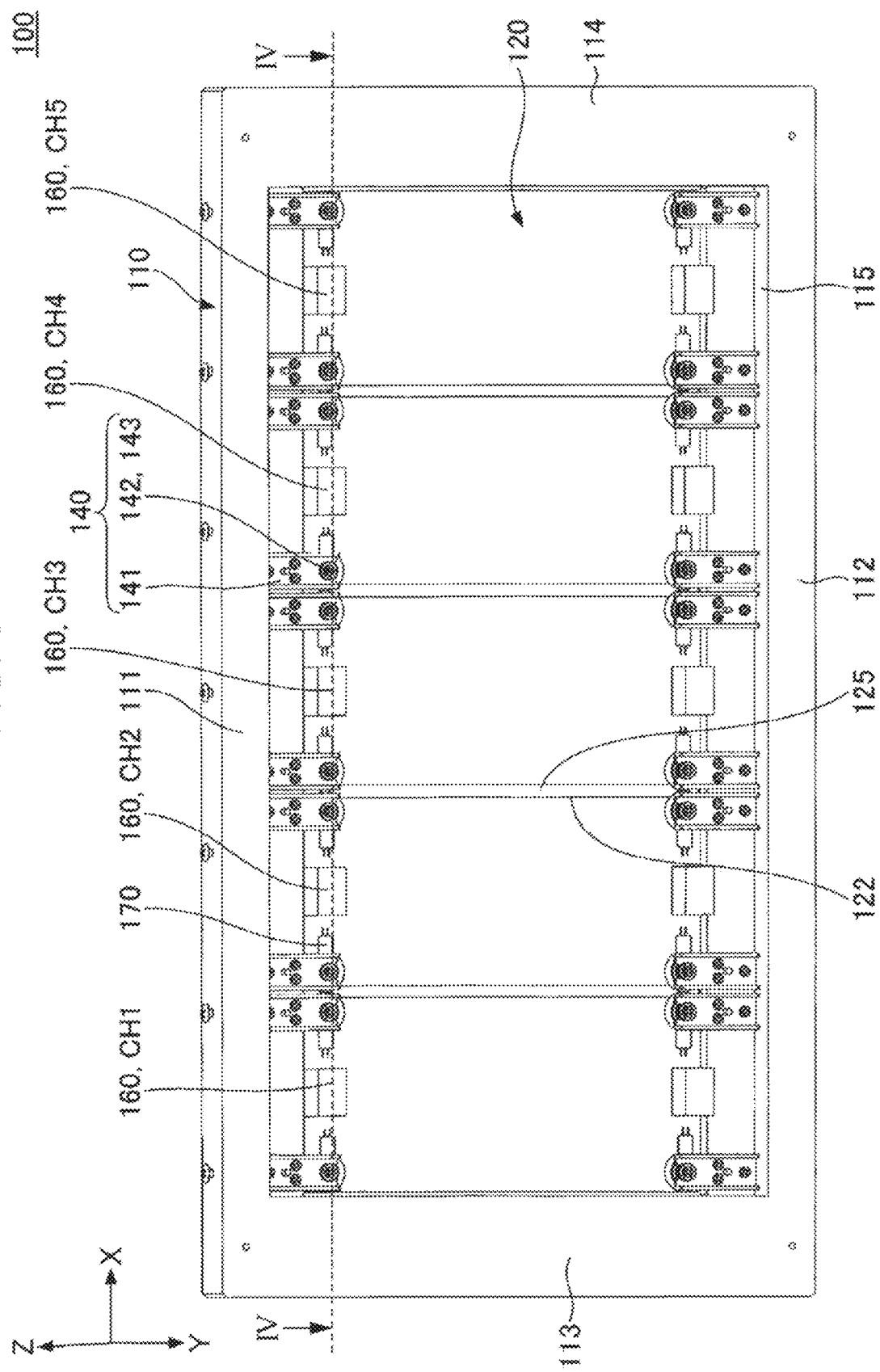
FIG. 3 illustrates the lower surface side in a state where a sensor sheet and an LCD have been detached from the electronic device according to the first embodiment.
Figure 4:
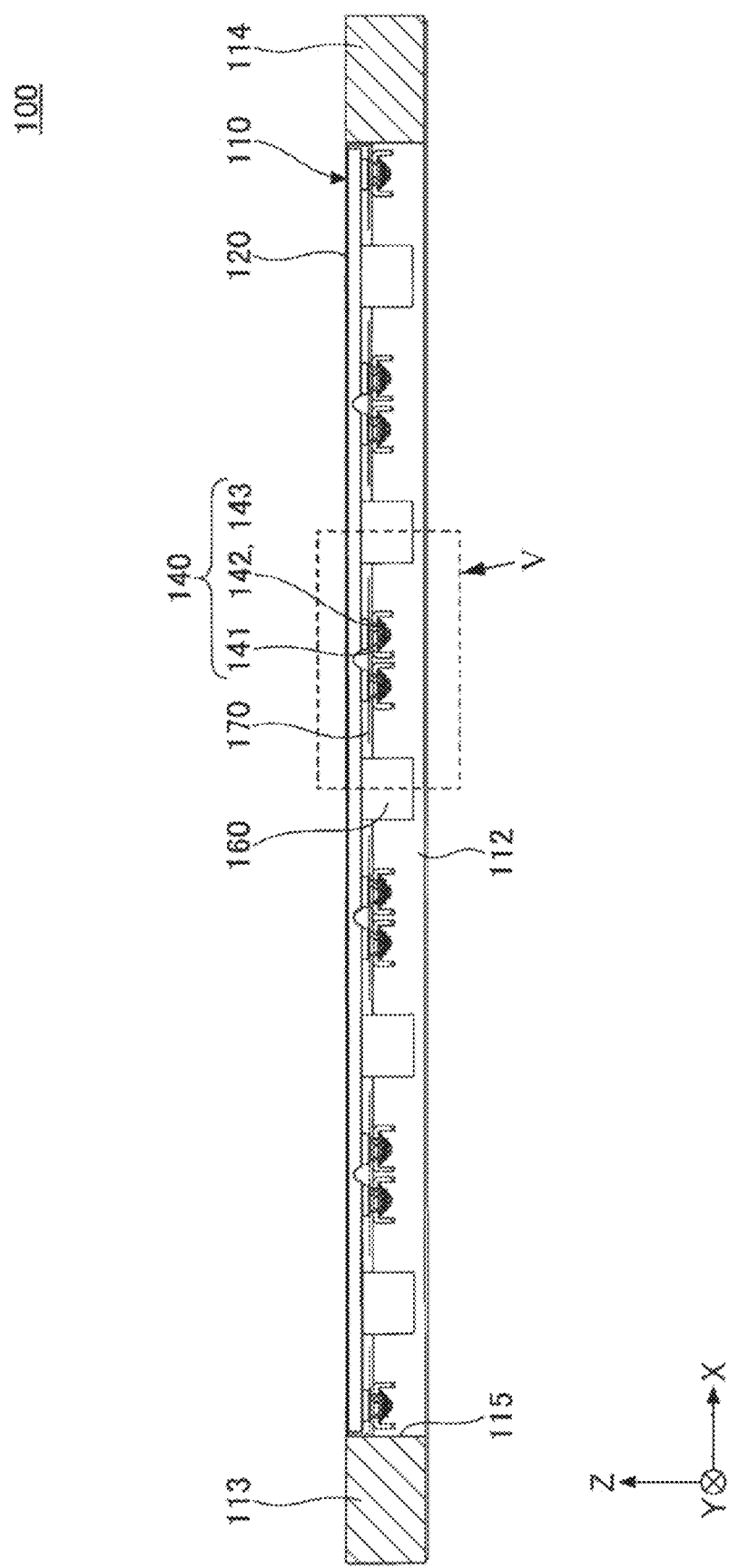
FIG. 4 illustrates a cross section taken along line A-A in FIGS. 2 and 3.
Figure 5:
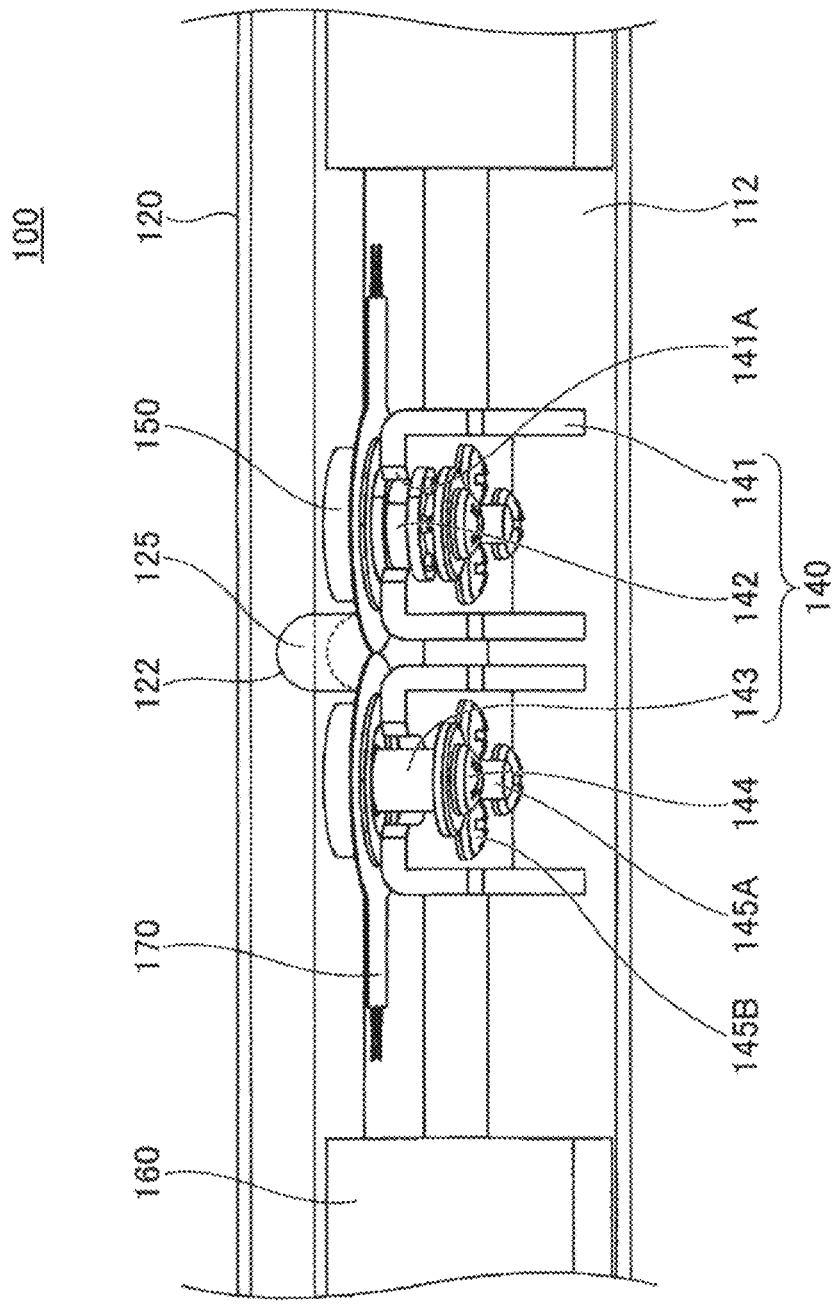
FIG. 5 is an enlarged view of a part surrounded by the rectangular broken line illustrated in FIG. 4 obliquely viewed from a lower side.
Figure 6:
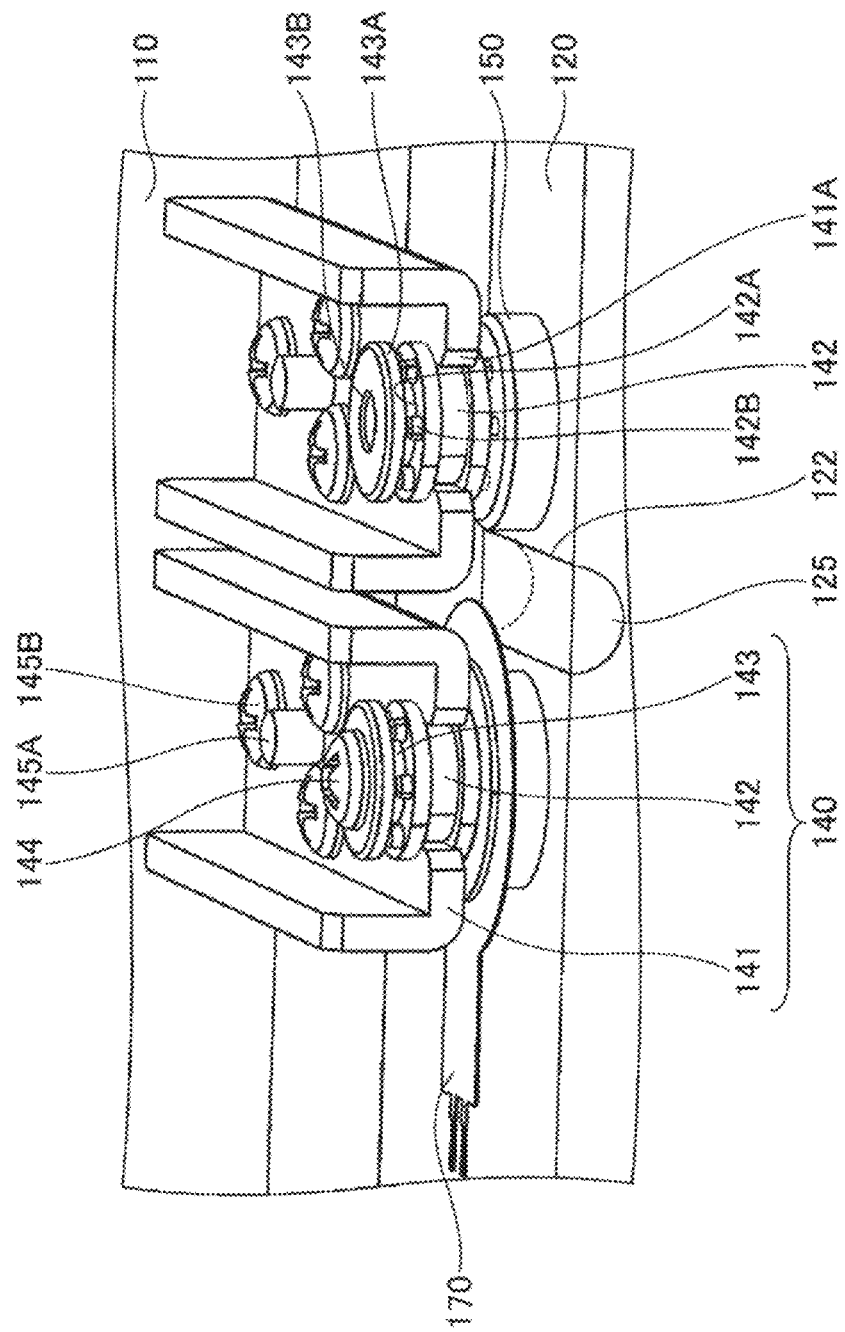
FIG. 6 is an enlarged view of suspension devices.

The following description is given with reference to FIGS. 3 to 6 in addition to FIGS. 1 and 2. FIG. 3 illustrates the lower surface side in a state where the sensor sheet 130A and the LCD 130B have been detached from the electronic device 100 according to the first embodiment. FIG. 4 illustrates a cross section taken along line A-A in FIGS. 2 and 3. FIG. 5 is an enlarged view of a part surrounded by the rectangular broken line illustrated in FIG. 4 viewed obliquely from a lower side. FIG. 6 is an enlarged view of the suspension device 140. The electronic device 100 further includes a pressure sensor 150 illustrated in FIG. 5.

The frame 110 is an example of a holding member and is a rectangular annular frame shaped member. Although the frame 110 may be constituted by separate members, the frame 110 is an integrally formed frame-shaped member in this example. In this example, it is assumed that the frame 110 has frame parts 111, 112, 113, and 114. The frame part 111 is a part that extends in the X direction on a −Y direction side. The frame part 112 is a part that extends in the X direction on a +Y direction side. The frame part 113 is a part that extends in the Y direction on a −X direction. The frame part 114 is a part that extends in the Y direction on a +X direction side. An inner side of the frame 110 is an opening, and this opening is provided to hold the operation panel 120. The frame 110 may be a part of a housing of the electronic device 100.

The operation panel 120 is a transparent thin plate member and is, for example, a thin plate made of glass or a thin plate made of a hard resin. The operation panel 120 is attached to the opening 115 at a center of the rectangular annual frame 110 with the use of ten suspension devices 140. A size of the operation panel 120 in plan view is set to match an opening size of the frame 110 so that almost no gap is formed when the operation panel 120 is attached to the frame 110. The operation panel 120 has an operation surface 121 that is located on an outer surface of the electronic device 100 and is operated by a user of the electronic device 100 by using a hand or the like. The operation surface 121 is an upper surface of the operation panel 120 and is substantially flush with an upper surface of the frame 110.

The operation panel 120 has four recessed parts 122 on a lower surface thereof. The lower surface is a surface opposite to the operation surface 121. The recessed parts 122 are groove-shaped parts recessed on the lower surface of the operation panel 120 along the Y direction, as illustrated in FIGS. 3 and 5. A cross section of the recessed parts 122 parallel with an XZ plane has a substantially arc shape. In FIG. 1, the recessed parts 122 are indicated by lines with alternate long and short dashes. The four recessed parts 122 extend from an end portion of the operation panel 120 on the −Y direction side to an end portion of the operation panel 120 on the +Y direction side. However, the recessed parts 122 are not limited to the substantially arc shape, as long as the recessed parts 122 have a round shape so that stress is not concentrated at one point. For example, in a case where the recessed parts 122 have a triangular shape, corner portions of the triangular shape may have a round shape.

The four recessed parts 122 are provided so as to divide the operation panel 120 into five equal parts in the X direction, and the four recessed parts 122 are disposed at equal intervals in the X direction. The four recessed parts 122 are provided to divide the operation panel 120 into five regions 120A1 to 120A5 in the X direction. More specifically, portions of the operation panel 120 where the recessed parts 122 are provided are thin and are lower in rigidity than portions other than the portions where the recessed parts 122 are provided. In a portion where rigidity is weak, only vibration of a low frequency region propagates, and as a result, less vibration is transmitted to an adjacent region. By providing such recessed parts 122, a region where vibration is generated in the operation panel 120 is divided into five regions. Note that since the LCD 130B is disposed below the operation panel 120, the recessed parts 122 are filled with a transparent resin 125 (see FIG. 5) represented by a transparent rubber material that has sufficiently low rigidity relative to the operation panel 120 and has a refractive index close to that of a material of the operation panel 120. In this way, the recessed parts 122 are made invisible from the operation surface 121 side of the operation panel 120.

Furthermore, the operation panel 120 has a viewing region 123A and a non-viewing region 123B, as illustrated in FIG. 1. The non-viewing region 123B is a rectangular annular region provided along four sides of the operation panel 120 in plan view, and the non-viewing region 123B is a region that does not overlap the LCD 130B and/or a region that cannot be viewed from an outside even in a case where the non-viewing region 123B overlaps the LCD 130B. The viewing region 123A is a region that is located inside the non-viewing region 123B in plan view and overlaps the LCD 130B, and thereby makes a display region constituted by the LCD 130B viewable. Since a part of the suspension device 140, the pressure sensor 150, the actuator 160, and the acceleration sensor 170 are disposed below the non-viewing region 123B, a decorating member may be provided on a part of the operation surface 121 so that these parts are not visible from the operation surface 121 side of the operation panel 120. The decorating member can be realized by a non-transparent film, a coating layer coated with non-transparent paint, or the like. Note that the decorating member may be provided on the lower surface of the operation panel 120 within the non-viewing region 123B.

The sensor sheet 130A is an example of a position detection part and is disposed on the lower surface side of the operation panel 120 so as to be superimposed on an upper surface side of the LCD 130B. The sensor sheet 130A may be, for example, a capacitance type. The sensor sheet 130A detects a position (coordinates) of an operation input performed on the operation surface 121. The sensor sheet 130A is transparent.

The LCD 130B is an example of a display part, and displays, for example, a graphic user interface (GUI) image. Since the sensor sheet 130A is transparent, an image displayed on the LCD 130B is viewed by a user through the sensor sheet 130A and the operation panel 120. Although an aspect in which the LCD 130B is used as a display part is described here, the display part is not limited to the LCD 130B and may be any image display element such as an organic electroluminescence (EL). Although an aspect in which the electronic device 100 includes a display part is described here, the electronic device 100 may be configured not to include a display part. In this case, members such as the sensor sheet 130A and the operation panel 120 need not be transparent.

The suspension device 140 is an example of an attaching part that attaches the operation panel 120 to the frame 110 and also has a function of a suspension that lessens vibration between the operation panel 120 and the frame 110. The suspension device 140 elastically holds the operation panel 120 relative to the frame 110. For example, twenty suspension devices 140 are provided. Specifically, ten suspension devices 140 are provided for each of the frame parts 111 and 112 of the frame 110. Each of the suspension devices 140 has a holder 141, a rubber member 142, and a shaft part 143.

When the ten suspension devices 140 attached to the frame part 111 are referred to as first to tenth suspension devices 140 from the −X direction side to the +X direction side and the four recessed parts 122 are referred to as first to fourth recessed parts 122 from the −X direction side to the +X direction side, the ten suspension devices 140 are disposed as follows, as illustrated in FIG. 3. The first suspension device 140 is provided at an end portion of the frame part 111 on the −X direction side, and the second and third suspension devices 140 are provided adjacent to each other with the first recessed part 122 interposed therebetween. The fourth and fifth suspension devices 140 are provided adjacent to each other with the second recessed part 122 interposed therebetween. The sixth and seventh suspension devices 140 are provided adjacent to each other with the third recessed part 122 interposed therebetween. The eighth and ninth suspension devices 140 are provided adjacent to each other with the fourth recessed part 122 interposed therebetween. The tenth suspension device 140 is provided at an end portion of the frame part 111 on the +X direction side. An interval between the first and second suspension devices 140, an interval between the third and fourth suspension devices 140, an interval between the fifth and sixth suspension devices 140, an interval between the seventh and eighth suspension devices 140, and an interval between the ninth and tenth suspension devices 140 are equal. The same applies to the ten suspension devices 140 attached to the frame part 112. That is, the suspension devices 140 are provided corresponding to the positions of the recessed parts 122 forming boundaries between the regions 120A1 to 120A5. By thus disposing the suspension devices 140 at positions close to the recessed parts 122, the suspension devices 140 disposed with the recessed part 122 interposed therebetween act as virtual support points, and the recessed parts 122 act as springs, and therefore a posture of the operation panel 120 is easily held.

The holder 141 is an example of an extending part, and one end thereof is fixed to a lower surface of the frame part 111 or 112, and the other end thereof is fixed to the lower surface of the operation panel 120. The holder 141 is made of a material having high rigidity. As illustrated in FIG. 5, the holder 141 is positioned with the use of a pin 145A and is fixed with the use of three screws 145B on the lower surface of the frame part 111 or 112. The holder 141 is a plate-shaped member that extends in the Y direction from the lower surface of the frame part 111 or 112 toward the opening 115 of the rectangular annular frame 110 in plan view. About a half of the holder 141 in the Y direction extends in the opening of the frame 110 in plan view, and has, at an end portion on the opening 115 side, a cutout part 141A (see FIG. 5) through which the rubber member 142 is inserted.

The rubber member 142 is an example of an elastic member, is provided between the holder 141 and the operation panel 120, and lessens vibration propagating to the holder 141 and the frame 110 by absorbing vibration of the operation panel 120. The rubber member 142 serves as a spring, and in a case where a spring constant thereof is small, a high frequency component of vibration is hard to transmit, and therefore an amount of transmitted vibration decreases as a whole.

The rubber member 142 is a substantially cylindrical member made of rubber and has, at a center thereof, a through hole 142A passing therethrough in an axial direction extending along the Z direction, as illustrated in FIG. 6. The shaft part 143 is inserted through the through hole 142A. In FIG. 5, for easier understanding of the configuration, the rubber member 142 of the suspension device 140 on the left side is omitted, and the shaft part 143 is illustrated. FIG. 6 illustrates a state obtained by reversing upper and lower sides of FIG. 5, and a screw 144 and the acceleration sensor 170 of the suspension device 140 on the right side are omitted for easier understanding of the configuration.

The rubber member 142 is fixed to the lower surface of the operation panel 120 by the shaft part 143, and an outer circumferential part thereof is engaged with the cutout part 141A of the holder 141, as illustrated on the right side of FIG. 5. Furthermore, the rubber member 142 has, on upper and lower surfaces thereof, a plurality of protrusions 142B arranged in an annular manner so as to surround the shaft part 143, as illustrated in FIG. 6. The rubber member 142 is in contact with the pressure sensor 150 with the plurality of protrusions 142B on the upper surface side interposed therebetween, and the rubber member 142 is in contact with a disc part 143A at a lower end of the shaft part 143 with the plurality of protrusions 142B on the lower surface side interposed therebetween. The disc part 143A is an annular part that protrudes outward in a radial direction along an outer circumference of the shaft part 143 at the lower end of the shaft part 143.

The shaft part 143 is fixed to the operation panel 120 with the use of the screw 144 in a state where the acceleration sensor 170 and the pressure sensor 150 are sandwiched between an upper end of the shaft part 143 and the lower surface of the operation panel 120. Accordingly, the rubber member 142 is sandwiched between a lower surface of the pressure sensor 150 and an upper surface of the disc part 143A of the shaft part 143 in a state where the protrusions 142B on the upper surface are in contact with the lower surface of the pressure sensor 150 and the protrusions 142B on the lower surface are in contact with the upper surface of the disc part 143A.

As described above, the suspension device 140 is attached to the frame 110 with the rubber member 142 interposed therebetween, and therefore has low rigidity and is fastened with weak fastening force. Accordingly, less vibration propagates to the frame 110, and vibration is excited only in the operation panel 120. Furthermore, since the rubber member 142 makes contact with the lower surface of the pressure sensor 150 and the upper surface of the disc part 143A with the protrusions 142B having a small contact area interposed therebetween, a configuration in which the operation panel 120 is easy to be deformed following deformation caused by vibration of the actuator 160 is realized.

The shaft part 143 is a cylindrical member that has the disc part 143A and a through hole 143B passing therethrough in the axial direction, and is fixed to the operation panel 120 with the use of the screw 144 inserted through the through hole 143B in a state where the shaft part 143 is inserted through the through hole 142A at the center of the rubber member 142. More specifically, the shaft part 143 is fixed to the operation panel 120 with the use of the screw 144 in a state where the acceleration sensor 170 and the pressure sensor 150 are sandwiched between the upper end of the shaft part 143 and the lower surface of the operation panel 120. The screw 144 is fastened to a screw hole of the operation panel 120 in a state where the screw 144 is inserted through a through hole provided through the acceleration sensor 170 and the pressure sensor 150. An external shape of the shaft part 143 matches an inner diameter of the through hole of the rubber member 142, so that a position of the rubber member 142 relative to the shaft part 143 is not shifted.

Note that the suspension device 140 may be configured such that the rubber member 142 is provided between the holder 141 and the operation panel 120 without including the shaft part 143. For example, the rubber member 142 may be provided so as to be sandwiched between the holder 141 and the operation panel 120. Furthermore, another elastic member may be used instead of the rubber member 142. Furthermore, a configuration in which the operation panel 120 is directly attached to the frame 110 at twenty points instead of twenty suspension devices 140 may be employed instead of the configuration for lessening vibration such as the suspension devices 140. However, in a case where such a configuration is employed, the effect of reducing an amount of transmitted vibration obtained by the rubber member 142 of the suspension device 140 is lost. Furthermore, since a vibration feedback amount around an attachment position cannot be increased, a central region in each region becomes a main region of vibration feedback. Furthermore, sound may be generated since vibration is not absorbed.

The pressure sensor 150 is a sensor that detects a pressure by which the operation panel 120 is pressed downward by an operation input. As the pressure sensor 150, a sensor using a piezoelectric element can be used, for example. The pressure sensor 150 is provided on each shaft part 143.

Two actuators 160 may be provided for each of the five regions 120A1 to 120A5 of the operation panel 120 divided by the four recessed parts 122. Five actuators 160 are provided at equal intervals along each of two end sides along the frame parts 111 and 112 of the operation panel 120. A position of each actuator 160 in the X direction is a center of each of the regions 120A1 to 120A5, and a position of each actuator 160 in the Y direction is an end portion of the operation panel 120 on any one of ±Y direction sides. When each region is regarded as a beam supported at the suspension devices 140, a weight of each actuator 160 is disposed at a portion where warpage of the beam is large by thus disposing each actuator 160 at a center of each region in the X direction. This can lower a resonance frequency of the beam and increase a vibration fluctuation amount, thereby increasing a panel deformation amount.

Although the actuator 160 can be, for example, a resonant linear resonant actuator (LRA), the actuator 160 may be a piezoelectric, magnetostrictive, or electrostrictive vibrating element. Each actuator 160 is attached to the lower surface of the operation panel 120 within the non-viewing region 123B with the use of an adhesive or the like. The actuator 160 is disposed so that the operation panel 120 is displaced in the Z direction by vibration generated by the actuator 160.

The acceleration sensor 170 is provided between the shaft part 143 and the pressure sensor 150. Accordingly, the electronic device 100 includes twenty acceleration sensors 170. The acceleration sensors 170 are provided to detect a state of vibration of the operation panel 120. The state of vibration is, for example, an acceleration, an angular velocity, or the like of vibration in the Z direction. Note that the state of vibration may be detected by using a distortion sensor, an angular velocity sensor instead of the acceleration sensor 170.

Figure 7:
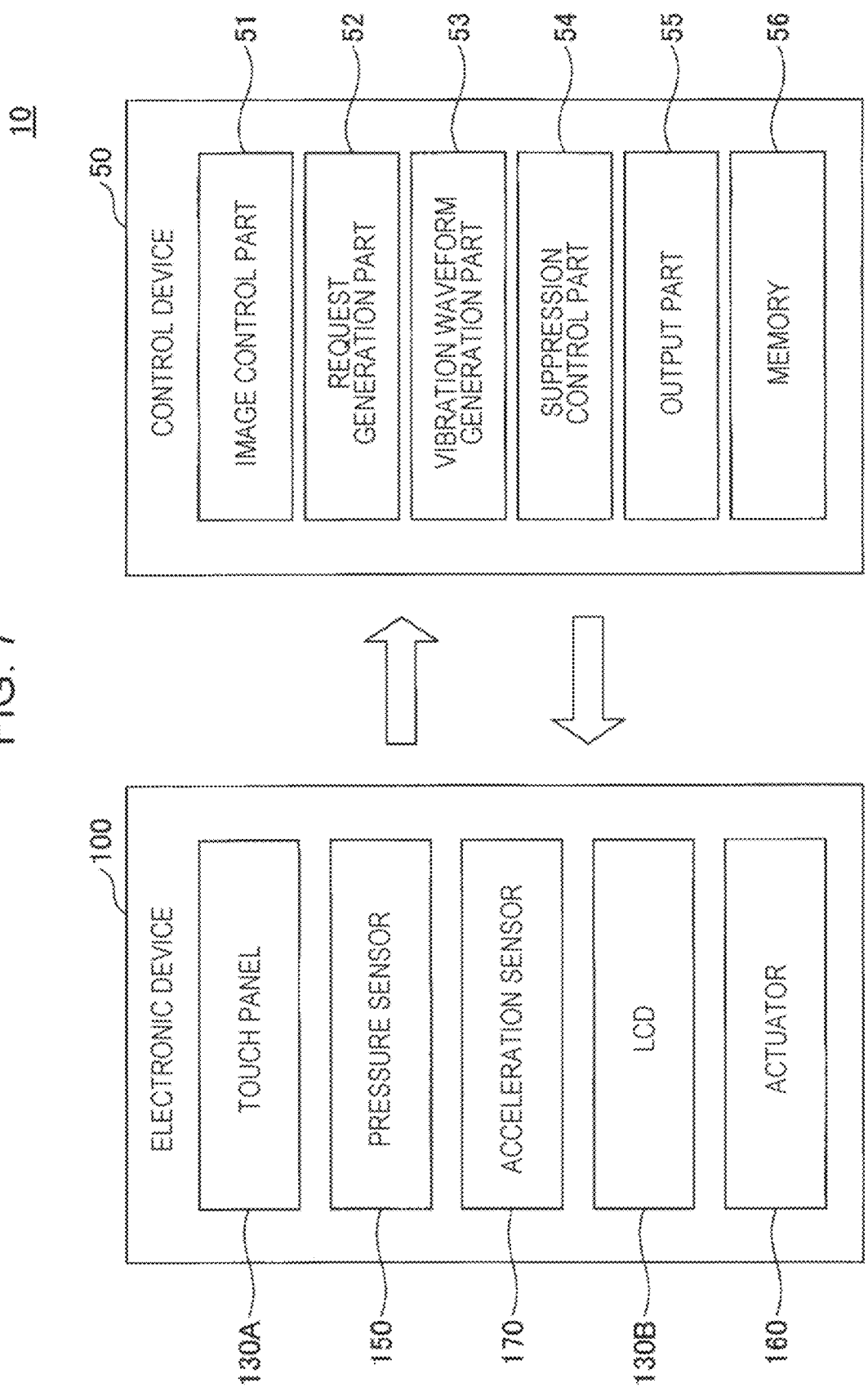
FIG. 7 is a block diagram illustrating a configuration of a vibration generation system including the electronic device and a control device.

FIG. 7 is a block diagram illustrating a configuration of a vibration generation system 10 including the electronic device 100 and a control device 50. The electronic device 100 and the control device 50 are connected to enable data communication through a bus or the like. In FIG. 7, the sensor sheet 130A, the LCD 130B, the pressure sensor 150, the actuator 160, and the acceleration sensor 170 are illustrated as constituent elements of the electronic device 100. The two actuators 160 included in each of the regions 120A1 to 120A5 are described as actuators 160 of any one of channels (CHs) 1 to 5.

The control device 50 is realized by a computer including members such as a central processing unit (CPU), a random access memory (RAM), a read only memory (ROM), an input output interface, and an internal bus.

The control device 50 includes an image control part 51, a request generation part 52, a vibration waveform generation part 53, a suppression control part 54, an output part 55, and a memory 56. The image control part 51, the request generation part 52, the vibration waveform generation part 53, the suppression control part 54, and the output part 55 are functions of a program executed by the control device 50 illustrated as functional blocks. The memory 56 is a functional expression of a memory of the control device 50.

The image control part 51 generates a GUI image or the like to be displayed on the LCD 130B. The GUI image is, for example, an image representing a push button. The image control part 51 determines contents of an operation input on the basis of coordinates detected by the sensor sheet 130A of the electronic device 100 and displays a GUI image or the like corresponding to the operation input at a desired position of the LCD 130B.

The request generation part 52 generates a request signal including a vibration generation request requesting generation of vibration in at least one of the regions 120A1 to 120A5 of the operation panel 120 by using a pressing action detected by the pressure sensor 150 of the electronic device 100 and a position detected by the sensor sheet 130A.

For example, in a case where an operation input is performed within the region 120A1, the vibration generation request is a command to drive the actuators 160 of the CH1. It is assumed here that the request signal also includes a vibration suppression request to generate vibration that suppresses vibration in any of the regions 120A2 to 120A5. The request signal is transmitted to the vibration waveform generation part 53 and the suppression control part 54. Data representing a combination indicating in which region the actuators 160 are driven on the basis of a vibration generation request and in which region the actuators 160 are driven on the basis of a vibration suppression request need just be stored in the memory 56.

The vibration waveform generation part 53 generates vibration waveform data representing a vibration waveform for vibrating the actuators 160 of a channel indicated by the vibration generation request of the request signal and transmits the vibration waveform data to the output part 55. Although the vibration waveform data is generated by using a pressing action detected by the pressure sensor 150 of the electronic device 100 and a position detected by the sensor sheet 130A in the present embodiment, a pressure value itself detected by the pressure sensor 150 in this process may be taken into consideration. In this way, suitable vibration waveform data according to an operation pressure can be generated.

The suppression control part 54 performs control for suppressing vibration propagating to a region other than a region where the actuators 160 driven on the basis of the vibration waveform data generated by the vibration waveform generation part are present. The suppression control part 54 generates suppression waveform data for driving the actuators 160 that generates driving force by substantially inverse-correcting a detected acceleration to suppress the acceleration of propagation in order to drive the actuators 160 of the channel indicated by the vibration suppression request of the request signal by using a position detected by the sensor sheet 130A of the electronic device 100 and an acceleration detected by the acceleration sensor 170 of each channel, and transmits the suppression waveform data to the output part 55. For example, in a case where the channel indicated by the vibration generation request is CH1, the channel indicated by the vibration suppression request is at least one of CH2 to CH5. The control performed by the suppression control part 54 for generating the suppression waveform data by using the acceleration detected by the acceleration sensor 170 is feedback control. The suppression control part 54 generates a driving waveform that can suppress vibration substantially inverse-corrected by using an acceleration. It is necessary to stabilize a controller in order to suppress propagated vibration without oscillation. Instability may be caused by a response delay such as a response delay or a calculation delay of the actuators 160. In general, proportional integral derivative (PID) control is used to lessen such instability and achieve stabilization. Furthermore, stability can be further increased by adding phase compensation combining phase lead and delay compensation in order to lessen influence of a phase fluctuation caused by a secondary mode of the panel. Vibration generated by the actuators 160 driven on the basis of the vibration waveform data can be suppressed in a desired region by vibration generated by the actuators 160 driven on the basis of the suppression waveform data. As a result, local vibration can be generated. Furthermore, by performing vibration suppression in CH1 after end of the vibration request, vibration at the position can be speedily suppressed after generation of the local vibration, and thereby sharp vibration can be generated. Although the suppression waveform data is generated by using an acceleration detected by the acceleration sensor 170 in the present embodiment, vibration characteristics (natural vibration frequency) of a member such as the operation panel 120 may be taken into consideration in this process. In this way, suppression waveform data effective for vibration suppression can be generated on the basis of vibration characteristics of a member that contributes to vibration.

The output part 55 outputs a drive signal including vibration waveform data and suppression waveform data. As a result, the vibration waveform data and the suppression waveform data are transmitted to the actuators 160 of corresponding channels. The actuators 160 of the channel indicated by the vibration generation request are driven by the vibration waveform data, and the actuators 160 of the channel indicated by the vibration suppression request are driven by the suppression waveform data.

The memory 56 stores therein a program and data necessary for the control device 50 to control the electronic device 100 and temporarily stores therein a request signal and the like.

Note that the channel corresponding to the vibration suppression request need just be set in accordance with vibration characteristics of the operation panel 120 of the electronic device 100. The operation panel 120 of the electronic device 100 is divided into the regions 120A1 to 120A5, and therefore vibration is hard to transmit between regions. However, in a case where the actuators 160 are driven in one region and it is desired to effectively suppress vibration in another region, it is only necessary to designate such a region by a vibration suppression request and drive the actuators 160 in a drive pattern for suppressing the vibration. It is only necessary to store, in the memory 56, data representing a combination of a region or a channel of the actuators 160 designated by the vibration generation request and a region or a channel of the actuators 160 designated by the vibration suppression request.

Figure 8:
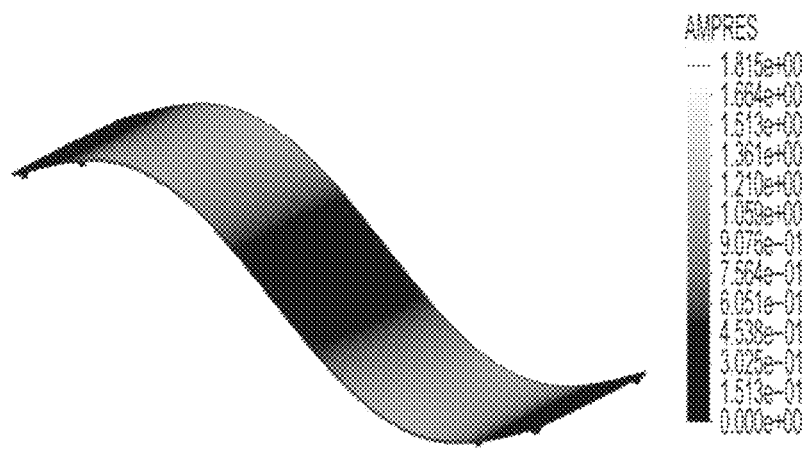
FIG. 8 illustrates a simulation result of a vibration waveform generated in the operation panel.
Figure 9:
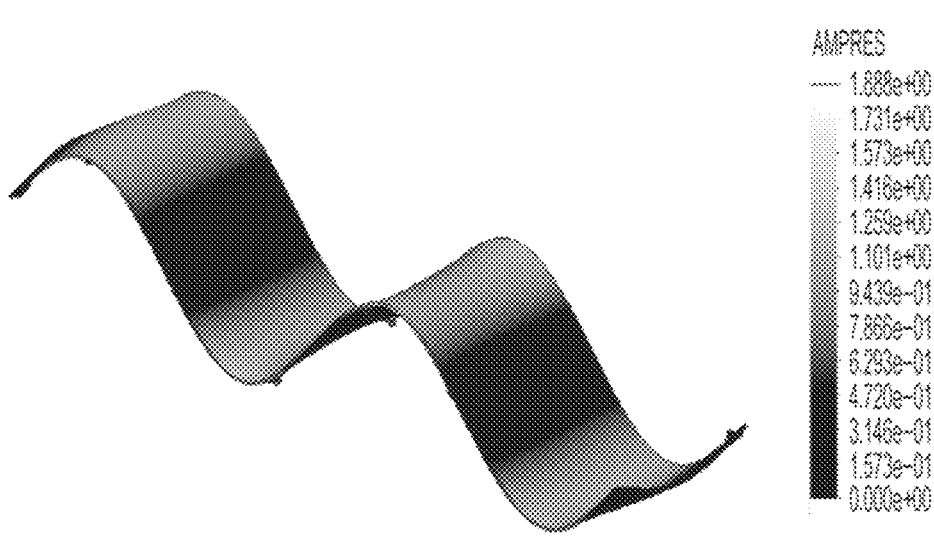
FIG. 9 illustrates a simulation result of a vibration waveform generated in the operation panel.

FIGS. 8 to 11 illustrate a simulation result of a vibration waveform generated in the operation panel 120. FIG. 8 is a vibration waveform in a case where free vibration was generated for a simulation model of the operation panel 120 fixed to the frame 110 only at four points, specifically, the first suspension devices 140 (at an end portion on the −X direction side) and the tenth suspension devices 140 (at an end portion on the +X direction side). Vibration of a 21 mode that is a second order in the X direction and a first order in the Y direction is generated. FIG. 9 illustrates an example of a mode that is a fourth order in the X direction and a first order in the Y direction as a high-order mode.

Figure 10:
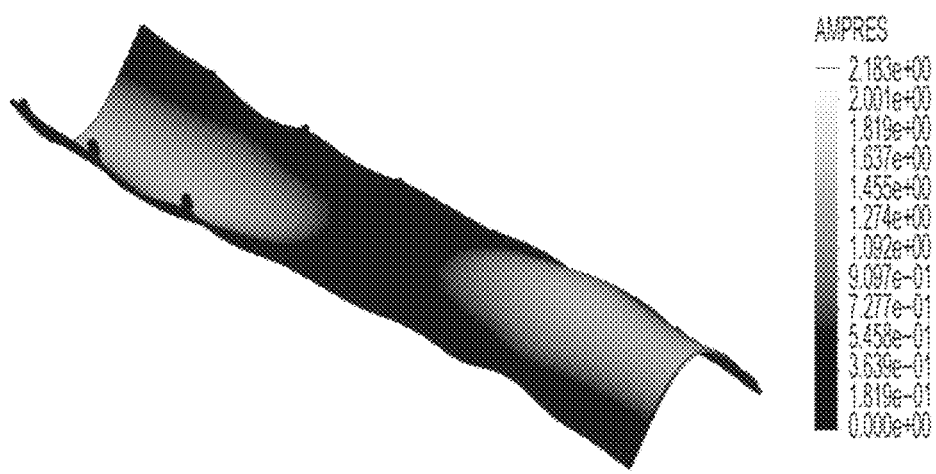
FIG. 10 illustrates a simulation result of a vibration waveform generated in the operation panel.

FIG. 10 illustrates a vibration waveform in a case where a simulation model in which eight suspension devices 140 were disposed in the X direction and the operation panel 120 was attached to the frame 110 with the use of sixteen suspension devices 140 in total was driven under the same driving condition for driving the actuators 160 as that of FIG. 8. In the simulation model of the operation panel 120 illustrated in FIG. 10, the operation panel 120 is attached to the frame 110 in a similar manner by adding six suspension devices 140 to the operation panel 120 attached to the frame 110 with the use of the ten suspension devices 140 as illustrated in FIG. 3.

Figure 11:
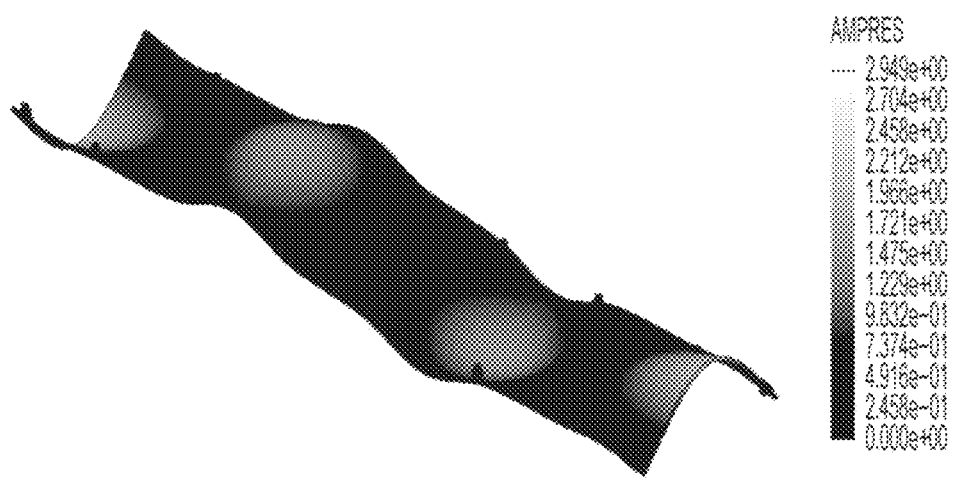
FIG. 11 illustrates a simulation result of a vibration waveform generated in the operation panel.

FIG. 10 is a simulation result of a vibration waveform in a case where sixteen suspension devices 140 in total were disposed in FIG. 8. Although the vibration waveform in FIG. 8 is a sinusoidal waveform, FIG. 10 shows that the vibration waveform changes due to influence of restraint given by fastening using the suspension devices 140. FIG. 11 is a simulation result of a vibration waveform in a case where sixteen suspension devices 140 in total were disposed in FIG. 9. FIG. 11 shows that there is influence of restraint given by fastening using the suspension parts even in a high-order mode. By fastening the operation panel 120 with the use of the suspension devices 140, not a free vibration mode (vibration orders mn, m, and n are integers), but a vibration mode in which restrained parts formed by the suspension devices 140 serve as nodes is excited. That is, a size of a local position where vibration is easily excited can be changed depending on positions of the restrained parts.

Since the operation panel 120 is attached to the frame 110 with the use of the suspension devices 140 as described above, vibration in which the suspension devices substantially serve as nodes is likely to be excited in a case where vibration is generated by the actuators 160. As a result, vibration is likely to be generated in a region where vibration is generated by the actuators 160 in the operation panel 120. Furthermore, since the operation panel 120 is fastened with weak rigidity by elastic fastening using the rubber member 142 included in each suspension device 140, vibration is excited only in the operation panel 120 while suppressing vibration propagation to the frame 110.

Since the recessed part 122 is located between the regions, vibration generated in a predetermined region is absorbed by the recessed part 122. In this way, vibration in a region other than a desired region is easily suppressed by a signal generated by the actuators 160 driven by suppression waveform data generated by the suppression control part 54. As a result, local vibration only in the desired region can be obtained.

Therefore, it is possible to provide the electronic device 100 having a positional relationship between the plurality of suspension devices 140 and the plurality of actuators 160 of the operation panel 120 that generates local vibration in the operation panel 120.

Figure 12:
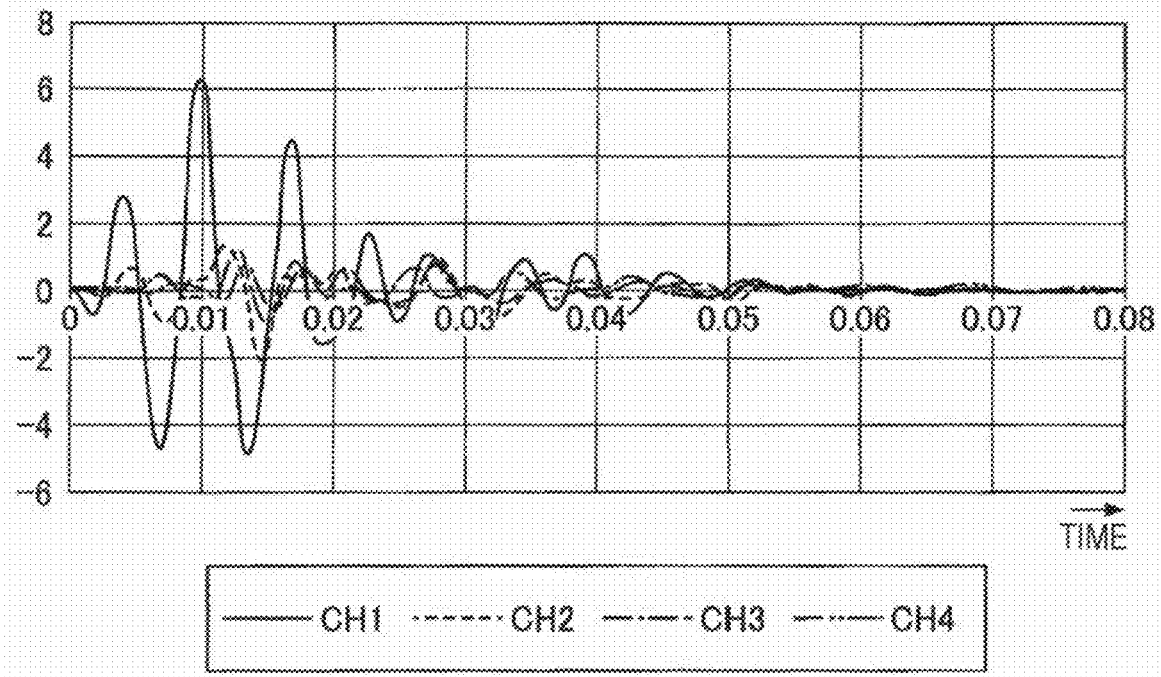
FIG. 12 illustrates a simulation result of vibration accelerations generated in the operation panel.

FIG. 12 illustrates a simulation result of vibration accelerations generated in the operation panel 120. In FIG. 12, the horizontal axis represents a time, and the vertical axis represents a vibration acceleration. In this example, simulation was conducted on the electronic device 100 having four channels (CH1 to CH4). A vibration instruction signal was vibration waveform data of a sinusoidal waveform of one cycle, a vibration request was a request to drive the actuators 160 of CH1, the vibration suppression request was a request to drive the actuators 160 of CH2 to CH4, and actuator drive signals of CH2 to CH4 were generated by suppression waveform data generated by the suppression control part 54 on the basis of acceleration data (vibration acceleration) detected by the acceleration sensor 170. As is clear from FIG. 12, a large vibration acceleration waveform based on the vibration instruction signal was generated as for CH1, and the actuators 160 of CH2 to CH4 exhibited a vibration acceleration of a small amplitude. Furthermore, as is clear from FIG. 12, the vibration accelerations of the actuators 160 of CH1 to CH4 stably attenuated with passage of time after end of the drive instruction signal (one cycle of the sinusoidal waveform) of CH1.

Figure 13:
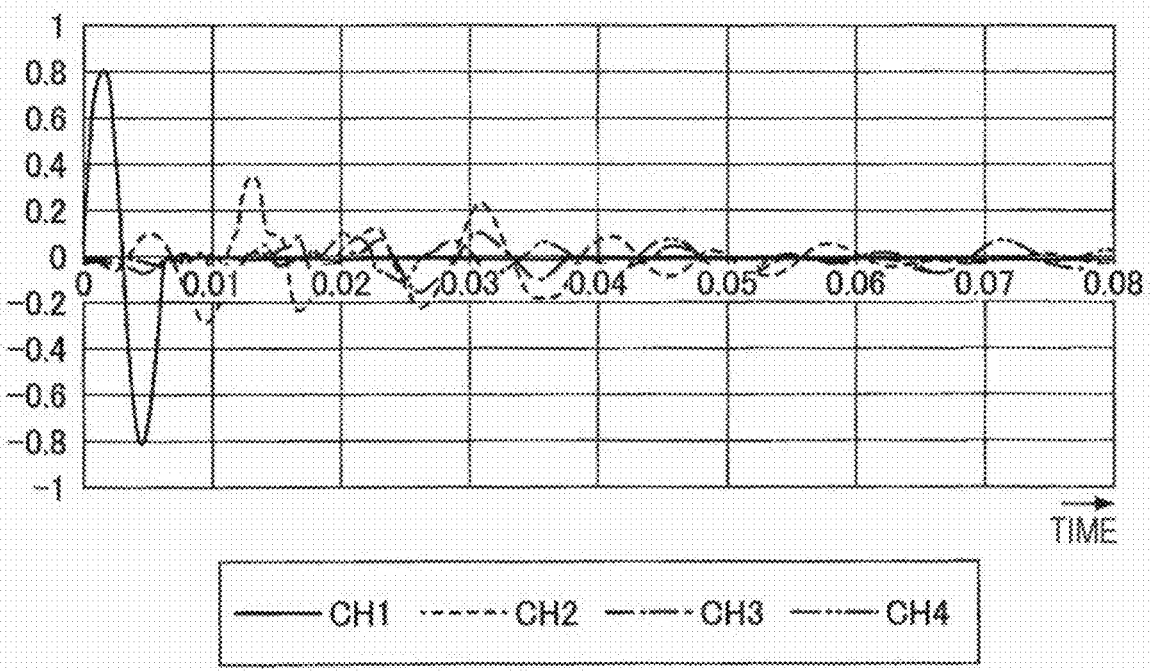
FIG. 13 illustrates drive signals in a case where vibration accelerations illustrated in FIG. 12 were obtained.

FIG. 13 illustrates drive signals in a case where the vibration accelerations illustrated in FIG. 12 were obtained. In FIG. 13, the horizontal axis represents a time, and the vertical axis represents a waveform of vibration waveform data or suppression waveform data included in a drive signal. In FIG. 13, CH1 is the vibration instruction signal (drive waveform), and CH2 to CH4 are vibration suppression drive signals. The vibration instruction signal is a sinusoidal wave of one cycle and has a waveform that becomes 0 after end of the vibration drive instruction of one cycle. This is also reflected in the vibration instruction signal diagram of CH1. Furthermore, CH2 to CH4 have drive signal waveforms according to the accelerations observed in CH2 to CH4 in FIG. 12 since the actuators are driven by a vibration suppression drive signal generated based on an acceleration signal. Note that since the panel has a transmission loss resulting from vibration propagation and vibration absorption occurring due to the rubber members 142 of the suspension devices 140, vibration itself decreases as a propagation distance increases. As is clear from FIG. 12, the amplitude of CH2, which is close to CH1 in which vibration is generated by the vibration instruction signal, is large, and the amplitude of CH4 is small.

Figure 14:
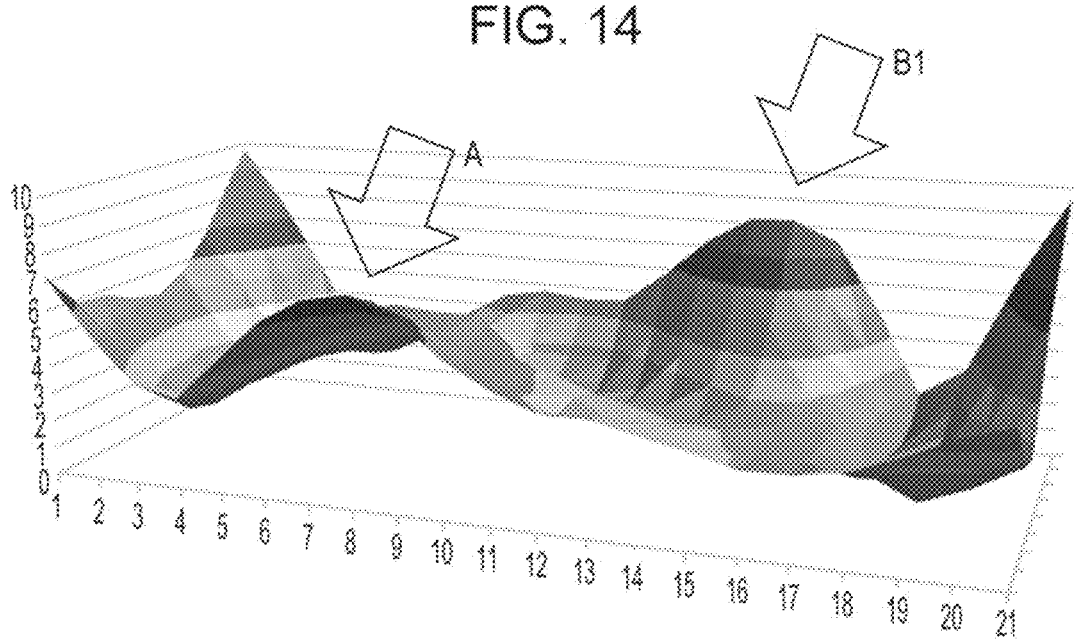
FIG. 14 illustrates a simulation result of a vibration waveform generated in the operation panel.
Figure 15:
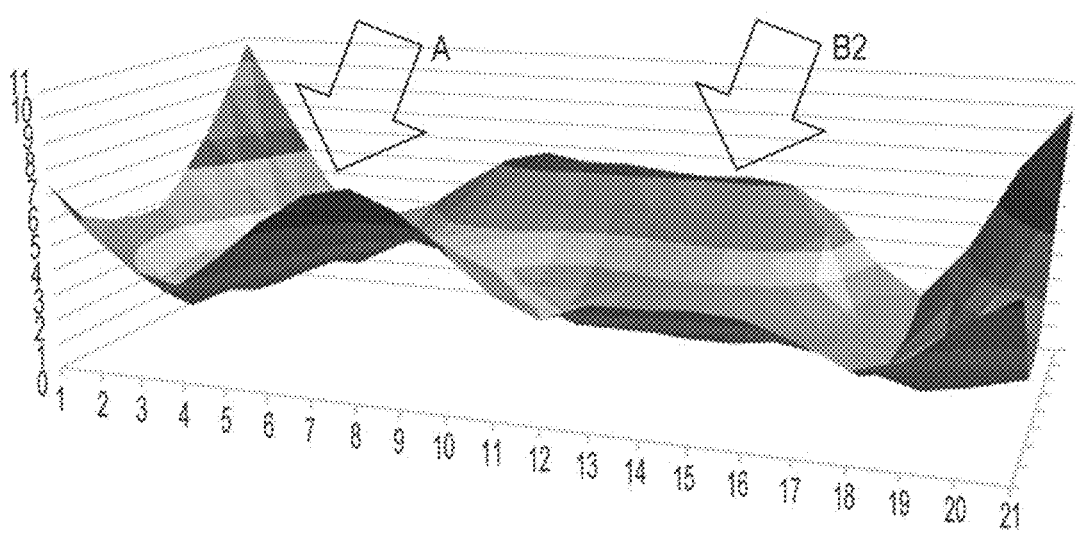
FIG. 15 illustrates a simulation result of a vibration waveform generated in the operation panel.

FIGS. 14 and 15 illustrate a simulation result of an intensity distribution of a vibration waveform generated in the operation panel 120. FIG. 14 illustrates a vibration waveform obtained in a case where only the actuators 160 of CH2 were driven by a drive signal including vibration waveform data. A region where a vibration intensity is high is generated in the region 120A2 (see FIG. 1) corresponding to CH2, and vibration excitation corresponding to a vibration mode of the panel indicated by arrow B1 is observed. Unnecessary vibration is generated at arrow B although a vibration presentation target region based on the drive instruction signal is the region 120A2. In the vibration mode of the panel, panel vibration in which positions restrained by the suspension devices 140 serve as nodes of vibration is likely to be excited. B1 is located at an antinode of vibration between the suspension devices in the region 120A4. FIG. 15 illustrates an intensity distribution of a vibration waveform generated in the operation panel 120 in a case where the actuators 160 of CH2 were driven by a drive signal including vibration waveform data, and the actuators 160 of CH4 were disposed at a position of B1 and driven by a vibration suppression signal generated based on a detected acceleration signal. Although the intensity distribution of B1 caused by vibration mode excitation corresponding to the panel vibration mode is seen in FIG. 14, the vibration intensity is lessened as indicated by B2 due to an effect of the vibration suppression control based on the vibration suppression signal in FIG. 15. Although the effect of the vibration suppression control is given by disposing the actuators at B1 in this example, excitation of vibration is also observed in an end portion of the region 120A1 and an end portion of the region 120A5 as observed in FIG. 14. Since an increase in vibration occurs at the end portions, vibration may be suppressed by also disposing an actuator at a panel end portion.

The operation panel 120 has various vibration modes, and there occurs a pattern in which vibration is also excited in a region where a driven instruction signal is not given as a frequency of the drive instruction signal changes. Meanwhile, since the operation panel 120 is elastically restrained by the suspension devices 140, a vibration mode excited in the operation panel 120 is substantially restricted to a position corresponding to a panel vibration mode in which elastic restraint points serve as nodes, and an antinode of vibration is likely to be located between the suspension devices 140. Therefore, it is possible to suppress vibration generated in a region other than a region where a drive instruction signal is given by disposing the actuators 160 between the suspension devices 140 and performing vibration suppression control on the actuators 160 other than the actuators 160 to which the drive instruction signal is given. Therefore, also in a case where driving of the actuators 160 based on a drive signal including suppression waveform data is added, it is possible to provide the electronic device 100 having a positional relationship between the plurality of suspension devices 140 and the plurality of actuators 160 of the operation panel 120 that generates local vibration in the operation panel 120. In a case where vibration can be generated not in the whole operation panel 120 but locally (only in a portion), application of the electronic device 100 is widened, and the electronic device 100 can be mounted in more products.

Furthermore, each of the suspension devices 140 has the holder 141, the rubber member 142, and the shaft part 143, and the rubber member 142 is provided between the holder 141 fixed to the frame 110 and the shaft part 143 fixed to the operation panel 120, and thereby the operation panel 120 is elastically fastened to the frame 110. The suspension devices 140 are suspensions and serve as nodes of vibration of the operation panel 120 to lessen vibration, but permit a certain degree of vibration without totally lessening vibration. By disposing such suspension devices 140 at boundaries between the regions 120A1 to 120A5, the operation panel 120 is divided into the regions 120A1 to 120A5, and thus a configuration in which vibration is hard to transmit to another region is realized. By providing such suspension devices 140, local vibration is generated in the operation panel 120.

Furthermore, since the holder 141 extends toward an inner side of the frame 110 having a frame shape, the operation panel 120 can be easily attached with the rubber member 142 interposed therebetween. Furthermore, since a portion of the holder 141 extending to the inner side of the frame 110, the rubber member 142, and the shaft part 143 are disposed within the non-viewing region 123B of the operation panel 120, the members can be efficiently disposed without hindering display on the LCD 130B.

Furthermore, since the actuators 160 are disposed within the non-viewing region 123B, the actuators 160 can be efficiently disposed without hindering display on the LCD 130B, and the actuators 160 can be disposed between adjacent suspension devices 140 (between attaching parts), and vibration can be efficiently generated in the regions (120A1 to 120A5) of the operation panel 120. Furthermore, by disposing the actuators 160 at a center between adjacent suspension devices 140, vibration can be more efficiently generated in the regions (120A1 to 120A5) of the operation panel 120.

Furthermore, since the operation panel 120 is a quadrangular panel having a longitudinal direction in plan view, it is easy to generate vibration in the longitudinal direction. Furthermore, since the plurality of actuators 160 are disposed along the longitudinal direction of the operation panel 120, vibration can be efficiently generated in the operation panel 120.

Although an aspect in which the holder 141 of each suspension device 140 is made of a material having high rigidity has been described above, the holder 141 may have elasticity, and each suspension device 140 may be realized by elasticity of the holder 141 and elasticity of the rubber member 142.

Although a configuration in which the actuators 160 are disposed between adjacent suspension devices 140 has been described above, the actuators 160 may be provided at the same position as the suspension devices 140. For example, in a case where the actuators 160 are attached to lower surface sides of the holders 141 of the suspension devices 140, a vibration axis of the actuators 160 and a holding axis of the suspension devices 140 that hold the operation panel 120 with respect to the frame 110 are aligned. According to such a configuration, vibration generation force of the actuators 160 is easily transmitted to portions (fixed portions) of the operation panel 120 fixed by the suspension devices 140, the vibration generation force of the actuators 160 transmitted to the fixed portions increases relatively, and it becomes easier to vibrate the fixed portions.

Figure 16:
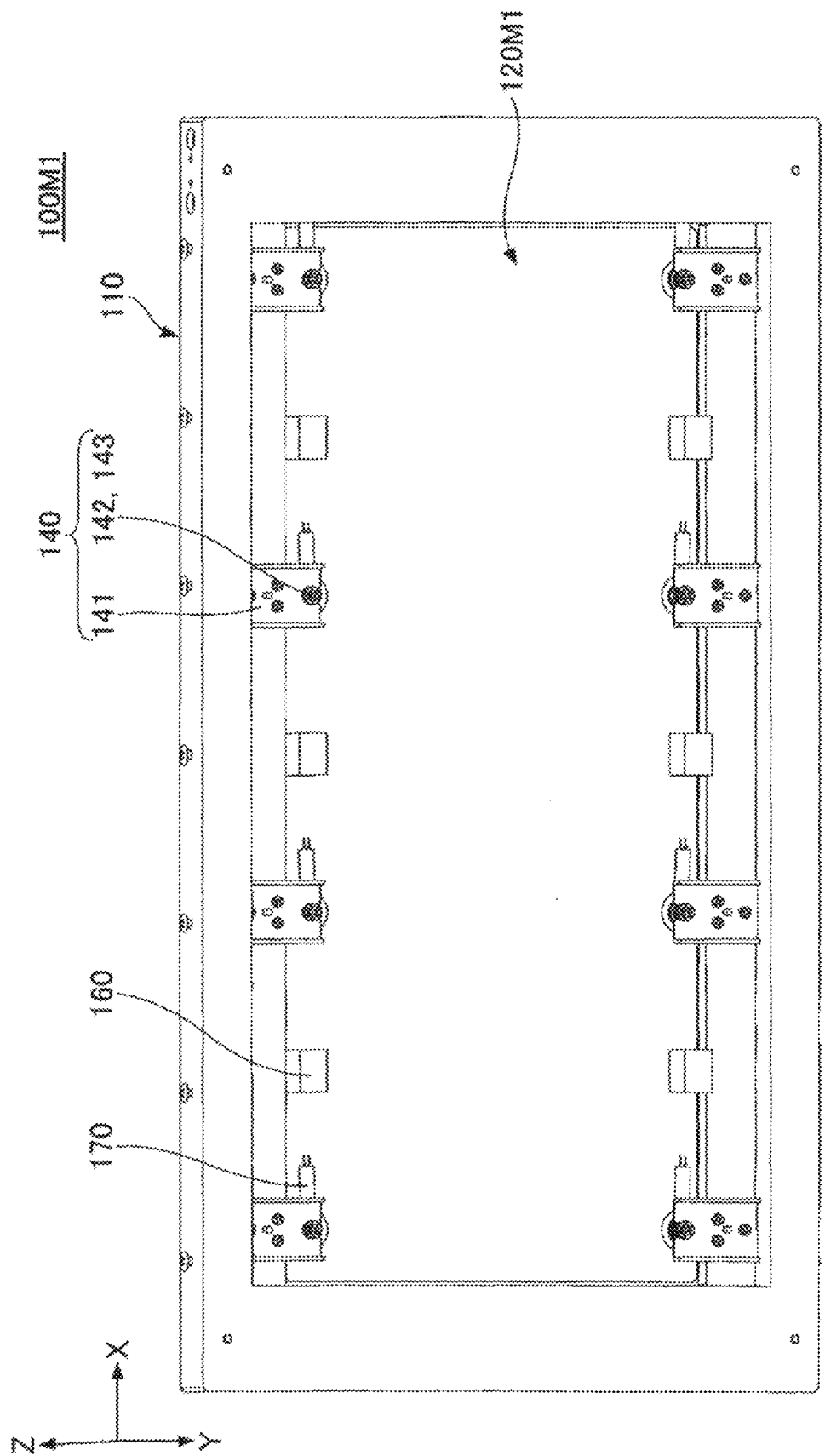
FIG. 16 illustrates an electronic device according to a modification of the first embodiment.

Although an aspect in which the operation panel 120 has the recessed parts 122 on the lower surface thereof has been described above, the operation panel 120 need not necessarily have the recessed parts 122. FIG. 16 illustrates an electronic device 100M1 according to a modification of the first embodiment. The electronic device 100M1 includes an operation panel 120M1 instead of the operation panel 120 of the electronic device 100 illustrated in FIGS. 1 to 6. The number of channels is three, and the operation panel 120M1 is divided into three regions in the X direction. One actuator 160 is provided on each of the +Y direction side and the −Y direction side in each of the regions. Furthermore, the suspension device 140 is provided on both sides of each actuator 160. Accordingly, the electronic device 100M1 includes six actuators 160 and eight suspension devices 140.

Also in the electronic device 100M1 having such a configuration, the operation panel 120 is divided into a plurality of regions by the suspension devices 140, and occurrence of vibration in a region other than a region where two actuators 160 are driven by a drive signal including vibration waveform data can be suppressed irrespective of whether or not the actuators 160 are driven by a drive signal including suppression waveform data in the region other than the region where two actuators 160 are driven by a drive signal including vibration waveform data.

Although an aspect in which the plurality of suspension devices 140 are disposed along the longitudinal direction of the operation panel 120 has been described above, one or a plurality of suspension devices 140 may be disposed along the short-side direction of the operation panel 120 in addition to the longitudinal direction or instead of the longitudinal direction. In this case, the operation panel 120 can also be divided into a plurality of regions in the short-side direction.

Although an aspect in which the plurality of actuators 160 are disposed along the longitudinal direction of the operation panel 120 has been described above, one or a plurality of actuators 160 may be disposed along the short-side direction of the operation panel 120 in addition to the longitudinal direction or instead of the longitudinal direction.

Therefore, it is possible to provide the electronic device 100M1 having a positional relationship between the plurality of suspension devices 140 and the plurality of actuators 160 of the operation panel 120M1 that generates local vibration in the operation panel 120M1.

Figure 17:
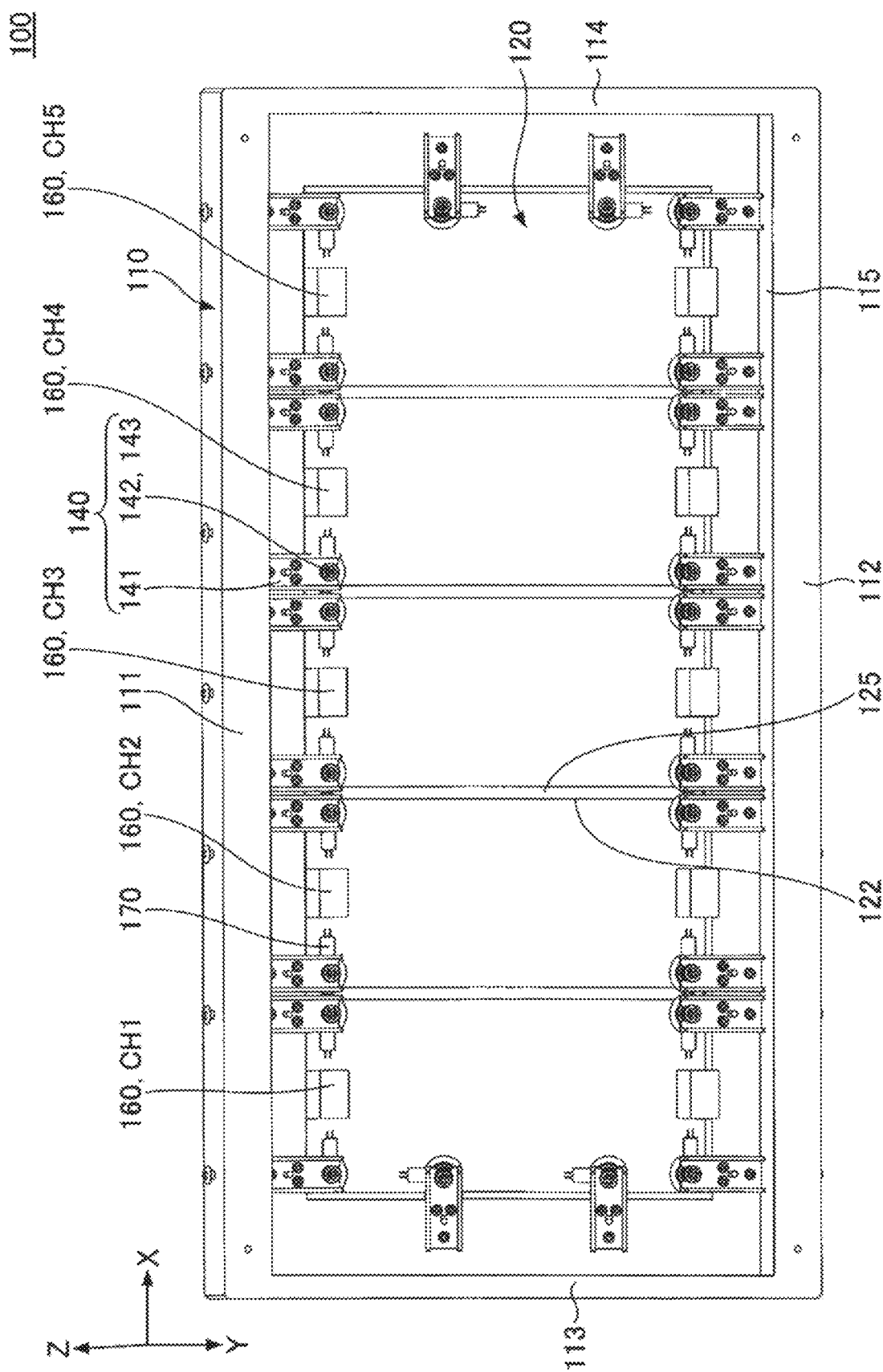
FIG. 17 illustrates an electronic device according to a modification of the first embodiment.

Although an aspect in which the suspension devices 140 are provided along only end sides of the operation panel 120 extending in the X direction has been described above, the suspension devices 140 may be provided along both end sides of the operation panel 120 extending in the X direction and end sides of the operation panel 120 extending in the Y direction. FIG. 17 illustrates an electronic device 100M2 according to a modification of the first embodiment.

The electronic device 100M2 includes a frame 110M, an operation panel 120M2, suspension devices 140, actuators 160, and acceleration sensors 170. Although the electronic device 100M2 also includes a sensor sheet 130A, an LCD 130B, and a pressure sensor 150, these members are omitted in FIG. 17.

The electronic device 100M2 is different from the electronic device 100M1 illustrated in FIG. 16 in that the suspension devices 140, the actuators 160, and the acceleration sensors 170 are provided along both end sides of the operation panel 120M in the X direction and end sides of the operation panel 120M in the Y direction. FIG. 17 illustrates a configuration in which two suspension devices 140 are provided along each side of the operation panel 120M in the Y direction in the electronic device 100 illustrated in FIG. 3. The electronic device 100M2 includes twenty-four suspension devices 140 in total. Note that the actuators 160 are provided only along the end sides of the operation panel 120 extending in the X direction.

The four suspension devices 140 provided along the end sides of the operation panel 120 extending in the Y direction are, for example, provided to suppress peaks of vibration at both ends in the X direction in FIGS. 14 and 15. Among the regions 120A1 to 120A5 (see FIG. 1), the regions 120A1 and 120A5 are adjacent to the regions 120A2 and 120A4 only on one side in the X direction, respectively. This is different from a structure having high connection rigidity such as the regions 120A2 to 120A4 that has an adjacent region on both sides in the X direction. Accordingly, the regions 120A1 and 120A5 have lower connection rigidity in the X direction than the regions 120A2 to 120A4. Accordingly, as illustrated in FIGS. 14 and 15, vibration is hard to be suppressed and a vibration peak tends to be large in a portion having low connection rigidity such as an end portion of the region 120A1 on the −X direction side and an end portion of the region 120A5 on the +X direction side. In the electronic device 100M2, to suppress such a vibration peak, vibration is suppressed by also providing the suspension devices 140 along the end sides of the operation panel 120 extending in the Y direction.

Although a configuration in which two suspension devices 140 are disposed along each of the end sides extending in the Y direction is illustrated, three or more suspension devices 140 may be provided along each of the end sides. Furthermore, although a configuration in which the suspension devices 140 are disposed along the end sides extending in the Y direction is illustrated, the actuators 160 may be disposed instead of this or in addition to this. In this case, operation similar to the actuators 160 disposed along the end sides extending in the X direction is performed.

Second Embodiment

Figure 18:
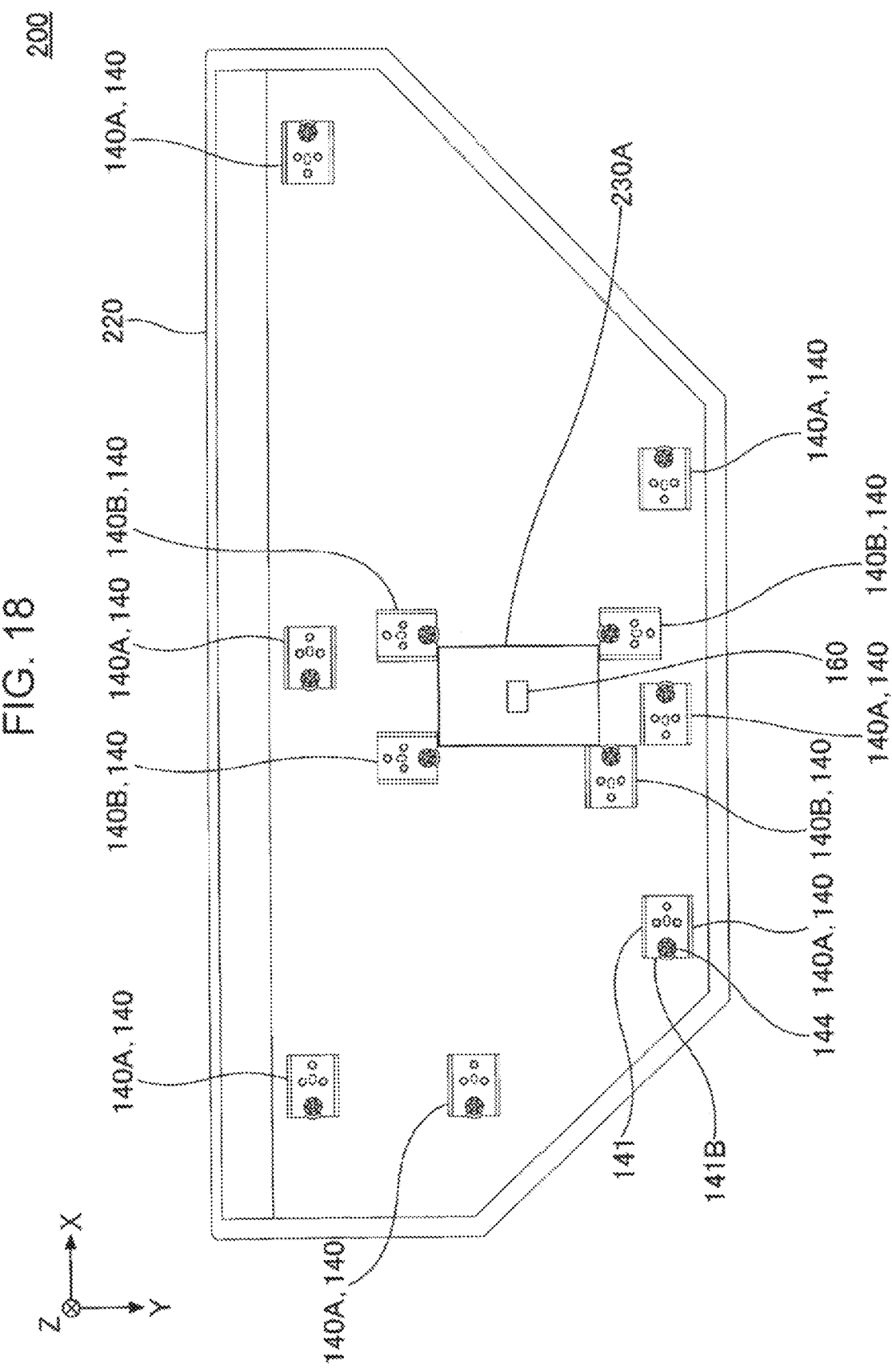
FIG. 18 is a plan view illustrating an electronic device according to a second embodiment.

FIG. 18 is a plan view illustrating an electronic device 200 according to a second embodiment. In the following description, an XYZ coordinate system is defined as in the first embodiment. In the following description, plan view is a XY plane view. Although a −Z direction side is referred to as a lower side or down and a +Z direction side is referred to as an upper side or up for convenience of description, this does not indicate a universal up-down relationship. Furthermore, a thickness is a dimension in a Z direction unless otherwise specified.

In the following description, constituent elements similar to those of the electronic device 100 according to the first embodiment are given identical reference signs, and description thereof is omitted. The electronic device 200 includes an operation panel 220, a sensor sheet 230A, a suspension device 140, and an actuator 160. In FIG. 18, a member that serves as a frame of the electronic device 200 is omitted. In the second embodiment, the member that serves as the frame of the electronic device 200 is, for example, an interior panel of a vehicle. The interior panel is provided on the −Z direction side of the operation panel 220 in FIG. 18. The operation panel 220 is an interior panel attached on an interior side of the vehicle, and FIG. 18 is a view seen through the member from a back surface side. Note that although the electronic device 200 includes an acceleration sensor 170 (see FIGS. 2, 5, and 6), the acceleration sensor 170 is omitted in FIG. 18.

The electronic device 200 includes, for example, eleven suspension devices 140. Among the eleven suspension devices 140, seven suspension devices 140A provided on an outer edge side of the operation panel 220 in plan view are an example of first attaching parts, and four suspension devices 140B provided around the actuator 160 within a region surrounded by the seven suspension devices 140A are an example of second attaching parts. The outer edge side of the operation panel 220 in plan view is a side closer to an outer edge than a central side of the operation panel 220 in plan view. The region surrounded by the seven suspension devices 140A is a region surrounded by a line connecting regions where the seven suspension devices 140A are located in plan view.

Hereinafter, the suspension devices 140A and the suspension devices 140B are simply referred to as suspension devices 140 in a case where the suspension devices 140A and the suspension devices 140B are not distinguished from each other. As for the suspension devices 140, a holder 141, three through holes 141B of the holder 141, and a screw 144 are illustrated in FIG. 18, and other constituent elements (e.g., a cutout part 141A of the holder 141, a rubber member 142, and a shaft part 143) are described with reference to FIGS. 5 and 6.

Although the suspension devices 140 are similar to the suspension devices 140 illustrated in FIGS. 5 and 6, a direction in which three screws 145B are inserted into the holder 141 in the second embodiment is reverse to that in the first embodiment. In the first and second embodiments, a direction from a screw head toward a tip of the screw 144 that fixes the rubber member 142 is the +Z direction. Although the screws 145B are inserted through the three through holes 141B of the holder 141 from the −Z direction side toward the +Z direction side in the first embodiment, the screws 145B are inserted through the through holes 141B of the holder 141 from the +Z direction side toward the −Z direction side and thereby the holder 141 is attached to an interior panel with the use of the screws 145B in the second embodiment.

Furthermore, the rubber member 142 is attached to a surface of the operation panel 220 on the −Z direction side by the shaft part 143 and the screw 144. FIG. 18 illustrates a state where an outer peripheral part of the rubber member 142 attached to the surface of the operation panel 220 on the −Z direction side is engaged with the cutout part 141A of the holder 141. The operation panel 220A is attached to the interior panel by engaging the rubber member 142 with the cutout part 141A of the holder 141 attached on the +Z direction side of the interior panel.

The sensor sheet 230A is provided on the −Z direction side of a central part (a part that is located in a central part of the operation panel 220 in the X direction and is located in a central part of the operation panel 220 in the Y direction) of the operation panel 220 in plan view. The sensor sheet 230A has a rectangular shape in plan view, and the four suspension devices 140B are provided outside four corners of a region where the sensor sheet 230A is provided.

The sensor sheet 230A is similar to the sensor sheet 130A according to the first embodiment and detects a position (coordinates) of an operation input performed on an operation surface of the operation panel 220 on the +Z direction side. In the second embodiment, a region where a position of an operation input performed on the operation panel 220 is detectable is a region that overlaps the sensor sheet 230A in plan view.

The actuator 160 is provided at a center of the operation panel 220 in plan view. The actuator 160 is provided so as to be superimposed on a −Z direction side of the sensor sheet 230A. The actuator 160 generates vibration in the operation panel 220 and provides a tactile impression to a fingertip or the like of a user who touches the surface of the operation panel 220 on the +Z direction side.

Figure 19:
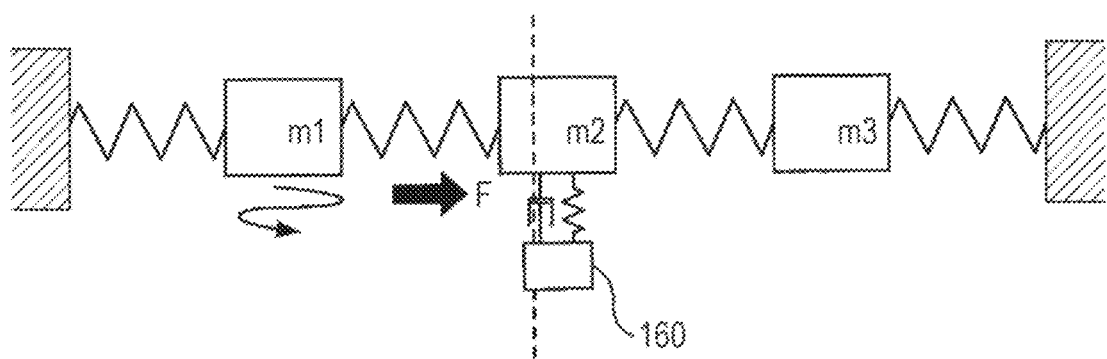
FIG. 19 illustrates a vibration system of the electronic device.

FIG. 19 illustrates a vibration system of the electronic device 200. It is, for example, assumed that third-order mode vibration is generated in the operation panel 220. For example, it is assumed that two vibrations having a peak on the +X direction side and the −X direction side are generated in a region on a +Y direction side relative to a center in the Y direction of the operation panel 220 illustrated in FIG. 18 and that a single signal is generated in a region on a −Y direction side relative to the center in the Y direction of the operation panel 220 illustrated in FIG. 18.

In such a case, the vibrating operation panel 220 is virtually divided into three parts, and a mass of the operation panel 220 can be virtually divided into three masses m1, m2, and m3.

By thus dividing the operation panel 220 into three parts, the electronic device 200 can be grasped as a vibration system in which the masses m1, m2, and m3 vibrate, as illustrated in FIG. 19. For example, the actuator 160 is regarded as being fixed to a portion of the mass m2.

Figure 20:
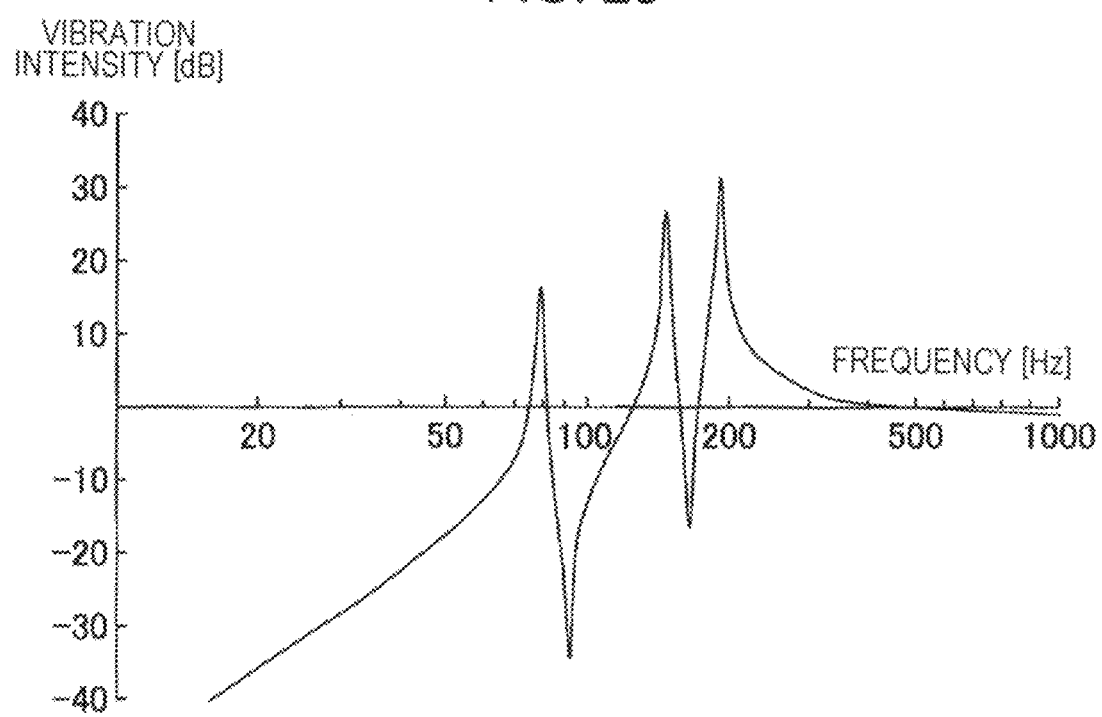
FIG. 20 illustrates vibration characteristics for comparison.

FIG. 20 illustrates vibration characteristics for comparison. FIG. 20 illustrates frequency characteristics of a vibration intensity at an actuator attachment point in a case where the operation panel 220 from which the actuator 160 has been detached is attached to the interior panel and is resonated. As illustrated in FIG. 20, a sharp peak was generated in bands of approximately 80 Hz, approximately 160 Hz, and approximately 200 Hz.

FIG. 21 illustrates vibration characteristics of the second embodiment. FIG. 21 illustrates frequency characteristics of a vibration intensity in a case where the actuator 160 is disposed on the operation panel 220, is attached to the interior panel, and is resonated. As illustrated in FIG. 21, the vibration intensity of approximately 80 Hz was remarkably reduced, the vibration intensity of approximately 200 Hz was also reduced, and a large vibration intensity was obtained at approximately 160 Hz due to resonance of the actuator 160. Since the vibration intensity of the actuator 160 is larger than the vibration intensity at approximately 200 Hz, it has been revealed that vibration of the actuator 160 proactively generates resonance. Such vibration is locally generated within a region surrounded by the four suspension devices 140B in the central part of the operation panel 220 in plan view.

Due to these effects, an equivalent mass of m2 is increased by adding a resonance system in which an actuator mass is connected with a spring and a damper interposed therebetween, as illustrated in FIG. 19. As a result, m1=m3<m2. Since transmission energy is constant, an amount of vibration amplitude of m2 caused due to influence of m1 and m3 decreases. It is considered that vibration of the actuator 160 is proactively expressed since the resonance system in which the actuator mass is connected with a spring and a damper interposed therebetween is added in this state. Note that the resonance system of the actuator 160 may be an LRA type having a movable element inside an actuator or may be a resonance system in which a spring and a damper system are connected to a VCM movable part.

Although a panel mode in which the panel elastically vibrates and an operation region and others are in a third-order mode is used, the mode is not limited to the third-order mode, and it is desirable to select a vibration mode that can cover the operation region. In a case where a high-order mode such as a fourth order or a fifth order is selected, influence of plural orders appears more. In order to reduce the influence, the order of the vibration mode may be reduced by reducing rigidity (reducing a thickness) of the operation region.

Therefore, it is possible to provide the electronic device 200 having a positional relationship between the plurality of suspension devices 140 and the plurality of actuators 160 of the operation panel 220 that generates local vibration in the operation panel 220.

Note that the present international application claims priority based on Japanese Patent Application No. 2020-117801 filed on Jul. 8, 2020, entire contents of which are incorporated herein by reference.

Although the electronic devices according to the exemplary embodiments of the present invention have been described, the present invention is not limited to the disclosed specific embodiments, and various modifications and changes can be made without departing from the scope of the claims.

What is claimed is:

1. An electronic device comprising:
a holding member;
an operation panel on which a user performs an operation input;
a plurality of attaching parts that attach the operation panel to the holding member;
a plurality of actuators each of which is provided between adjacent attaching parts among the plurality of attaching parts in plan view and generates vibration in the operation panel;
a position detection part that detects a position where the operation input is performed; and
a control part that drives at least one of the plurality of actuators in accordance with a position detected by the position detection part.

2. The electronic device according to claim 1, wherein
the attaching parts are suspension device that lessen vibration between the operation panel and the holding member.

3. The electronic device according to claim 2, wherein
each of the suspension devices has an extending part that is fixed to the holding member and extends from the holding member toward the operation panel and an elastic member that is provided between the extending part and the operation panel.

4. The electronic device according to claim 2, further comprising a display part that is provided so as to overlap the position detection part and has a display region,
wherein
the operation panel has a viewing region where the display region of the display part is viewable in plan view and a non-viewing region outside the viewing region, and
the plurality of actuators are fixed to the operation panel within the non-viewing region.

5. The electronic device according to claim 4, wherein
each of the suspension devices has an extending part that is fixed to the holding member and extends from the holding member into the non-viewing region of the operation panel and an elastic member that is provided between the extending part and the operation panel.

6. The electronic device according to claim 3, wherein
the elastic member is a rubber member.

7. The electronic device according to claim 6, wherein
each of the suspension devices further has a shaft part fixed to the operation panel; and
the rubber member is attached to the shaft part.

8. The electronic device according to claim 1, wherein
the operation panel is a rectangular panel having a longitudinal direction and a short-side direction in plan view; and
the plurality of attaching parts and the plurality of actuators are disposed along the longitudinal direction.

9. The electronic device according to claim 8, wherein
the plurality of attaching parts are disposed at equal intervals along the longitudinal direction, and the plurality of actuators are disposed at equal intervals along the longitudinal direction.

10. The electronic device according to claim 8, wherein each of the plurality of actuators is disposed at a center between the adjacent attaching parts along the longitudinal direction.

11. The electronic device according to claim 8, wherein the operation panel is divided into a plurality of regions along the longitudinal direction; and
each of the plurality of attaching parts is provided at a boundary between the plurality of regions.

12. The electronic device according to claim 8, further comprising one or a plurality of actuators disposed along the short-side direction.

13. The electronic device according to claim 1, wherein the operation panel is a rectangular panel having a longitudinal direction and a short-side direction in plan view and is divided into a plurality of regions along the longitudinal direction or the short-side direction; and
each of the plurality of attaching parts is provided at a boundary between the plurality of regions.

14. The electronic device according to claim 11, wherein the operation panel has a recessed part provided along the boundary between the plurality of regions.

15. The electronic device according to claim 14, wherein the recessed part is provided on a surface opposite to an operation surface of the operation panel on which the operation input is performed.

16. The electronic device according to claim 14, wherein the operation panel is transparent; and
the recessed part is filled with a transparent resin.

17. The electronic device according to claim 1, wherein the actuators are resonant, piezoelectric, magnetostrictive, or electrostrictive vibrating elements.

18. An electronic device comprising:
a holding member;
an operation panel on which a user performs an operation input;
a plurality of first attaching parts that attach the operation panel to the holding member;
an actuator that is provided in a central part of the operation panel in plan view and generates vibration in the operation panel;
a plurality of second attaching parts that are provided around the actuator within a region surrounded by the plurality of first attaching parts in plan view and attach the operation panel to the holding member;
a position detection part that detects a position where the operation input is performed; and
a control part that drives the actuator in accordance with a position detected by the position detection part.

* * * * *